(12) United States Patent
Griffin et al.

(10) Patent No.: US 12,047,305 B2
(45) Date of Patent: Jul. 23, 2024

(54) USING MULTI-PHASE CONSTRAINT PROGRAMMING TO ASSIGN RESOURCE GUARANTEES OF CONSUMERS TO HOSTS

(71) Applicant: Oracle International Corporation, Redwood Shores, CA (US)

(72) Inventors: Joshua Deen Griffin, Wexford, PA (US); Wataru Miyoshi, Campbell, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/979,688

(22) Filed: Nov. 2, 2022

(65) Prior Publication Data

US 2023/0155956 A1     May 18, 2023

Related U.S. Application Data

(63) Continuation of application No. 17/454,940, filed on Nov. 15, 2021, now Pat. No. 11,502,971.

(51) Int. Cl.
    *H04L 47/78*      (2022.01)
    *H04L 47/762*      (2022.01)
    *H04L 47/80*      (2022.01)

(52) U.S. Cl.
    CPC .......... *H04L 47/781* (2013.01); *H04L 47/762* (2013.01); *H04L 47/803* (2013.01); *H04L 47/805* (2013.01)

(58) Field of Classification Search
    CPC ... H04L 47/762; H04L 47/781; H04L 47/803; H04L 47/805
    See application file for complete search history.

(56) References Cited

U.S. PATENT DOCUMENTS

| | | |
|---|---|---|
| 7,110,913 B2 | 9/2006 | Monroe et al. |
| 9,378,056 B2 | 6/2016 | Oda et al. |
| 9,864,636 B1 | 1/2018 | Patel et al. |
| 10,896,073 B1 | 1/2021 | Jain |
| 11,188,391 B1 | 11/2021 | Sule |
| 11,360,821 B1 | 6/2022 | Dey et al. |

(Continued)

OTHER PUBLICATIONS

"Oracle Advanced Constraint Technology," R&D Group, pp. 1-2, Retreived on Nov. 17, 2021.

(Continued)

*Primary Examiner* — Jeong S Park
(74) *Attorney, Agent, or Firm* — Invoke

(57) ABSTRACT

"Resource guarantee" refers to a unit of a resource that is guaranteed and therefore designated to a consumer. A multi-phased constraint programming (CP) approach is used to determine assignments of resource guarantees of a set of consumers to a set of hosts in a resource system. Phase I uses CP to segregate non-split consumers from split consumers. Phase II uses CP to assign each cotenant group of non-split consumers to a respective host. Phase III uses CP to assign resource guarantees of the split consumers across the hosts, wherein resource guarantees of a single split consumer may be splits across different hosts. Each phase involves execution of a CP solver based on a different CP data model. A CP data model declaratively expresses combinatorial properties of a problem in terms of constraints. CP is a form of declarative programming.

20 Claims, 17 Drawing Sheets

(56) References Cited

U.S. PATENT DOCUMENTS

| | | | |
|---|---|---|---|
| 2005/0132362 A1* | 6/2005 | Knauerhase | G06F 9/5077 718/1 |
| 2006/0277307 A1 | 12/2006 | Bernardin et al. | |
| 2008/0184250 A1 | 7/2008 | Hamadi et al. | |
| 2010/0057518 A1 | 3/2010 | Naveh et al. | |
| 2010/0161373 A1 | 6/2010 | Connors et al. | |
| 2012/0311597 A1* | 12/2012 | Manula | G06F 9/5077 718/104 |
| 2013/0014107 A1 | 1/2013 | Kirchhofer | |
| 2013/0103640 A1 | 4/2013 | Rehman | |
| 2013/0111033 A1 | 5/2013 | Mao et al. | |
| 2014/0007097 A1* | 1/2014 | Chin | G06F 9/5077 718/1 |
| 2014/0172929 A1* | 6/2014 | Sedayao | G06F 3/0661 707/827 |
| 2015/0312169 A1 | 10/2015 | Klots et al. | |
| 2016/0156567 A1* | 6/2016 | Miyahara | H04L 43/0876 709/226 |
| 2016/0283271 A1 | 9/2016 | Ashby et al. | |
| 2016/0306678 A1* | 10/2016 | Hira | G06F 9/5083 |
| 2016/0323169 A1 | 11/2016 | Song et al. | |
| 2017/0195410 A1 | 7/2017 | Sebbah et al. | |
| 2017/0220364 A1 | 8/2017 | Kadioglu et al. | |
| 2018/0024860 A1 | 1/2018 | Balle et al. | |
| 2018/0074855 A1 | 3/2018 | Kambatla | |
| 2018/0173605 A1 | 6/2018 | Kadioglu et al. | |
| 2018/0357342 A1 | 12/2018 | Iwai et al. | |
| 2019/0095245 A1 | 3/2019 | Abes et al. | |
| 2019/0327185 A1 | 10/2019 | Hassan et al. | |
| 2020/0034201 A1* | 1/2020 | Lu | G06F 9/5005 |
| 2020/0074412 A1 | 3/2020 | Colena | |
| 2020/0341597 A1 | 10/2020 | Cannata et al. | |
| 2020/0344329 A1 | 10/2020 | Cannata et al. | |
| 2021/0026430 A1 | 1/2021 | Nakamura et al. | |
| 2021/0287112 A1 | 9/2021 | Ramasamy et al. | |
| 2023/0043579 A1 | 2/2023 | Chitalwala et al. | |
| 2023/0205595 A1 | 6/2023 | Singh et al. | |

OTHER PUBLICATIONS

C. Bessiere, "Constraint Propagation," F. Rossi, p. van Beek, T. Walsh (Eds.), Handbook of CP, 2006, pp. 1-63.

D Meier, "Resource Allocation in Clouds," Communication Systems VII, Chapter 1, Stiller, B., et al., eds., University of Zurich, Jun. 2014, pp. 1-57.

F. Rossi, P. van Beek, and T. Walsh, "Handbook of Constraint Programming," Elsevier, 2006, pp. 969.

G. Pesant and M. Gendreau, "A Constraint Programming Framework for Local Search Methods," Journal of Heuristics, vol. 5, 1999, pp. 255-279.

H.N. Van et al, "Autonomic Virtual Resource Management for Service Hosting Platforms," In: ICSE Workshop on Software Engineering Challenges of Cloud Computing, 2009, pp. 1-8.

M. Garcia de la Banda, P. J. Stuckey, P. V. Hentenryck, M. Wallace, "The Future of Optimization Technology," Constraints, vol. 19, Issue 2, 2014, pp. 1-12.

M. Leconte, "A bounds-based reduction scheme for constraints of difference," In Proceedings of the Second International Workshop on Constraint-based Reasoning, 1996, pp. 19-28.

M. Trick, "A Dynamic Programming Approach for Consistency and Propagation for Knapsack Constraints," Annals of Operations Research, vol. 118, 2003, pp. 73-84.

R. Bartak, "Constraint Propagation and Backtracking-based Search," Summer school on CP, 2005. pp. 1-42.

S Heinz and J.C. Beck, "Solving Resource Allocation/Scheduling Problems with Constraint Integer Programming," 2011, pp. 1-10.

Shaw P, "A Constraint for Bin Packing," In: Wallace M. (eds) Principles and Practice of Constraint Programming—CP 2004. CP 2004, Lecture Notes in Computer Science, vol. 3258, Springer, Berlin, Heidelberg, 2004, pp. 648-662.

W Lin, et al, "A Threshold-based Dynamic Resource Allocation Scheme for Cloud Computing," Procedia Engineering, vol. 23, 2011, pp. 695-703.

\* cited by examiner

USING MULTI-PHASE CONSTRAINT PROGRAMMING TO ASSIGN RESOURCE GUARANTEES OF CONSUMERS TO HOSTS

INCORPORATION BY REFERENCE; DISCLAIMER

The following application is hereby incorporated by reference: application Ser. No. 17/454,940 filed on Nov. 15, 2021. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to the use of constraint programming. In particular, the present disclosure relates to using multi-phase constraint programming to assign resource guarantees of consumers to hosts.

BACKGROUND

A consumer is a device, software, object, and/or entity that consumes one or more resources. A host is a device, software, object, and/or entity that hosts one or more resources. Each host as a limited number of resources. In a shared environment, a set of consumers share a set of resources hosted by a set of hosts. For example, in a cloud environment, a set of database instances may share a set of central processing units (CPUs); the CPUs may be hosted by a set of servers.

Further a consumer's resource usage may be split across resources of multiple hosts. For example, at a particular time, a database instance may consume a total of 5 CPUs. The database instance may consume 2 CPUs of a first server and 3 CPUs of a second server. A consumer whose resource usage is divided across multiple hosts may be referred to as "split"; a consumer whose resource usage is assigned to a single host may be referred to as "non-split" or "unsplit."

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
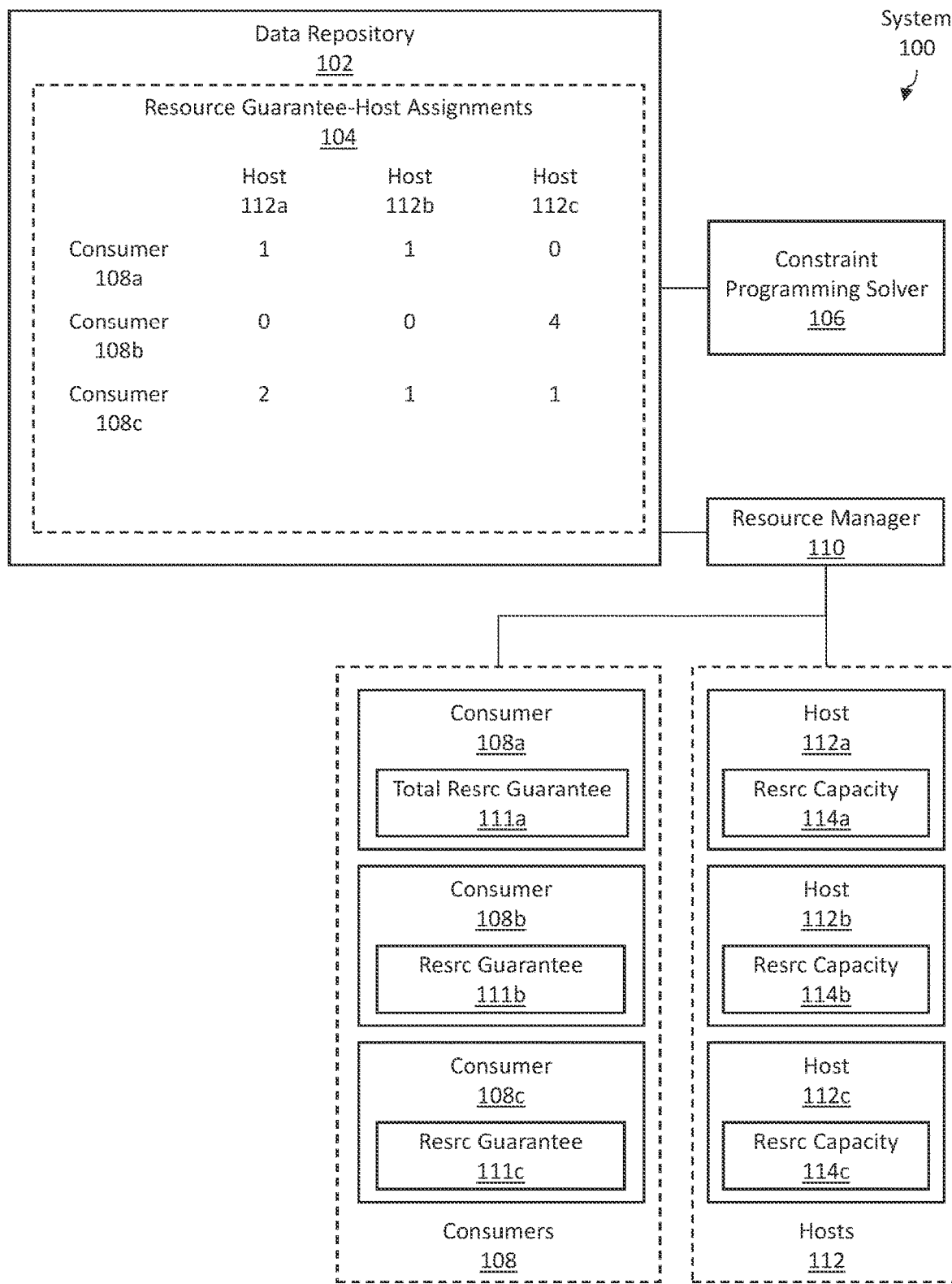
FIG. 1 illustrates a resource manager managing a resource system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RESOURCE SYSTEM ARCHITECTURE
3. RESOURCE GUARANTEE ASSIGNMENT SYSTEM ARCHITECTURE
4. CONSTRAINT PROGRAMMING DATA MODELS
5. A PHASED-APPROACH TO DETERMINING AND UPDATING RESOURCE GUARANTEE-HOST ASSIGNMENTS
6. GENERATING A PHASE I CONSTRAINT PROGRAMMING DATA MODEL AND CONSTRAINT PRORAMMING SEARCH DIRECTIVE
7. GENERATING A PHASE II CONSTRAINT PROGRAMMING DATA MODEL AND CONSTRAINT PRORAMMING SEARCH DIRECTIVE
8. GENERATING A PHASE III CONSTRAINT PROGRAMMING DATA MODEL AND CONSTRAINT PRORAMMING SEARCH DIRECTIVE
9. APPLYING A CONSTRAINT PROGRAMMING DATA MODEL AND A CONSTRAINT PROGRAMMING SEARCH DIRECTIVE TO A CONSTRAINT PROGRAMMING SOLVER
10. DESIGNATING RESOURCES BASED ON RESOURCE GUARANTEE-HOST ASSIGNMENTS

11. HARDWARE OVERVIEW
12. MISCELLANEOUS; EXTENSIONS

1. General Overview

One or more embodiments include assigning resource guarantees of a set of consumers across a set of hosts. The term "resource guarantee" refers to a guarantee of a single unit of a resource to a particular consumer; the single unit of resource is dedicated to the particular consumer and cannot be used by other consumers. The term "total resource guarantee" refers to a total number of resource guarantees that are owed to a particular consumer, which indicates the total number of units of a resource that are guaranteed to the particular consumer. Different consumers may be guaranteed different numbers of resources. The total resource guarantee provided to a consumer may derive from a contractual obligation to the consumer (or an owner of the consumer), a technical requirement of the consumer, a user configuration, and/or other factors.

Resource guarantees of consumers are assigned to hosts. Assignment of a resource guarantee of a particular consumer to a particular host indicates that a resource of the particular host is dedicated to the particular consumer. The sum of the resource guarantees assigned to a host cannot exceed the host's capacity. A consumer's resource guarantees may be split across resources of multiple hosts.

One or more embodiments include determining a proposed resource guarantee-host assignment with one or more of the following overall goals:
  usage of resources on any given host, at any given time, is minimized;
  interruption of active sessions when adopting the proposed assignments is minimized;
  resource guarantees of each consumer are assigned to a single host to the extent possible;
  resource guarantees of each consumer, for which resource guarantees are split, are evenly distributed across hosts to the extent possible.

One or more embodiments include applying constraint programming (CP) to determine proposed resource guarantee-host assignments while achieving the above overall goals. CP is a form of declarative programming. CP obtains a solution to a real-world problem based on a specification of a CP data model and, optionally, a CP search directive. In contrast, imperative programming is based on a specification of a sequence of steps.

A CP data model includes a set of data model elements; domains of possible values that can be assigned to each element; and one or more constraints that define combinations of values that are allowed to be assigned to the elements. Based on the CP data model, a set of values for the set of elements that satisfies all constraints is determined. A set of values for the set of elements that satisfies all constraints may be referred to herein as a "CP solution."

A CP search directive guides the assignment of a set of values to a set of data model elements that satisfies all constraints, as specified by a CP data model. The CP search directive results in certain sequences in which values are attempted for assignment to one or more data model elements. Additionally or alternatively, the CP search directive prioritizes the assignment of certain values over other values for one or more data model elements. Different CP search directives for a same CP data model may result in a different CP solution. Additionally or alternatively, different CP search directives for a same CP data model may result in different efficiency levels and/or runtimes for obtaining a CP solution.

One or more embodiments include applying CP to historical data associated with a set of consumers and hosts to determine a proposed resource guarantee-host assignment that would achieve the above overall goals for the historical data. The historical data may include, for example, telemetric data indicating resource usages of each consumer on each host, and telemetric data indicating a number of active sessions of each consumer on each host. A "resource usage" refers to a use of a unit of resource. An "active session" refers to a connection between an external client and a consumer based on the most-recently captured telemetric data. The telemetric data may be collected at regular time intervals over a time period of interest. Additional historical data may include a total resource guarantee of each consumer; a resource capacity of each host; and a most-recent resource guarantee-host assignment.

One or more embodiments include dividing the problem of assigning resource guarantees to hosts into multiple phases. In order to achieve the overall goal of prioritizing assignment of resource guarantees of a single consumer to a single host, Phase I first segregates the consumers that will not be split from the consumers that may potentially be split. Phase I segregates non-split consumers from split consumers while minimizing maximum host usage. Phase I also identifies which non-split consumers are to be assigned to the same host. Non-split consumers assigned to a same host are referred to herein as a "cotenant consumer group" or "cotenant group." Based on the cotenant groups identified in Phase I, Phase II identifies a specific host for each cotenant group, such that interruption of active sessions when adopting the proposed assignments is minimized. Based on the split consumers identified in Phase I, Phase III determines assignments of resource guarantees of the split consumers to the hosts while minimizing maximum host usage. Each phase has a separate CP data model and a separate CP search directive.

One or more embodiments include generating a Phase I CP data model. The Phase I CP data model includes several data model elements: consumer-host assignment elements, an unassigned consumer count element, per-host per-time resource usage elements, a maximum host usage element. Each consumer-host assignment element corresponds to a respective consumer. A consumer-host assignment element assumes a value representing the host that will be assigned to the corresponding consumer. Phase I involves consumer-host assignment elements rather than resource guarantee-host assignment elements because all resource guarantees of a single consumer will be assigned to a single host. The flexibility to split is captured in a "dummy host" that is in a domain of each consumer-host assignment element. Hence, a domain of each consumer-host assignment element includes values representing the set of hosts plus an extra "dummy host." Each per-host per-time resource usage element corresponds to a respective host and a respective time. A per-host per-time resource usage element assumes a value representing the number of resources of the corresponding host that is used by consumers assigned to the corresponding host at a given time. Other data model elements of the Phase I CP data model are discussed below.

The Phase I CP data model further includes several constraints: a guarantee-capacity constraint, a resource usage constraint, a maximum host usage constraint, an unassigned count-cap constraint, a symmetry breaking constraint. A guarantee-capacity constraint requires that a sum of the resource guarantees of consumers assigned to each host be less than or equal to the resource capacity of the host. A resource usage constraint requires that a sum of the resource usages of consumers assigned to each host be less than or equal to the resource capacity of the host. A guarantee-capacity constraint and/or a resource usage constraint may be expressed as a bin packing constraint. Additionally or alternatively, a guarantee-capacity constraint and/or a resource usage constraint may be expressed as a less-than-or-equal-to (LE) constraint. An unassigned count-cap constraint requires that the number of consumers assigned to the dummy host be less than or equal to an unassigned consumer cap. The unassigned consumer cap is a configurable value, which may be determined by an administrator and/or another application. Other constraints of the Phase I CP data model are discussed below.

One or more embodiments include generating a Phase I CP search directive. A Phase I CP search directive includes a minimization objective function to minimize a maximum host usage. The maximum host usage is the maximum value from a set of hypothetical resource usages for each host at each time, wherein a hypothetical resource usage on a particular host at a particular time is the number of resources that would hypothetically be used on the particular host when the resource usages captured for the resource system at the particular time are distributed across the set of hosts based on the proposed assignments as indicated by the consumer-host assignment elements.

One or more embodiments include generating a Phase II CP data model. The Phase II CP data model includes several data model elements: cotenant group-host assignment elements, per-host penalty elements, a total penalty element. Each cotenant group-to-host assignment element corresponds to a respective cotenant consumer group. A cotenant group-host assignment element assumes a value representing the host that will be assigned to the corresponding cotenant group. Phase II involves cotenant group-host assignment elements rather than resource guarantee-host assignment elements because all consumers, within a cotenant group as determined from Phase I, will be assigned to a same host. However, Phase I has not determined the specific host to be assigned to each cotenant group. The specific assignment is made in Phase II such that the interruption of active sessions is minimized. Each per-host penalty element corresponds to a respective host. A per-host penalty element assumes a value representing the number of sessions that are interrupted when moving from the most-recent assignments to the proposed assignments. Other data model elements of the Phase II CP data model are discussed below.

The Phase II CP data model further includes several constraints: a cotenant group all different constraint, per-host penalty constraints, a penalty sum constraint. A cotenant group all different constraint requires that each cotenant group be assigned to a different host; no cotenant groups may share any host. A penalty sum constraint requires that a total penalty associated with the proposed assignments be equal to the sum of the number of interrupted sessions for each host. Other constraints of the Phase II CP data model are discussed below.

One or more embodiments include generating a Phase II CP search directive. A Phase II CP search directive includes a minimization objective function associated with a total penalty. A total penalty is a sum of the per-host penalty.

One or more embodiments include generating a Phase III CP data model. The Phase III CP data model includes several data model elements: resource guarantee-host assignment elements, per-host per-time resource usage elements, a maximum host usage element, per-consumer per-host uninterrupted session count elements, per-host penalty elements, and a total penalty element. Each resource guarantee-host assignment element corresponds to a respective host and a respective consumer. A resource guarantee-host assignment element assumes a value indicating a number of resource guarantees of the corresponding consumer that will be assigned to the corresponding host. Using a different data model element to represent each consumer-host pair allows the resource guarantees of a single consumer to be assigned to different hosts. Other data model elements of the Phase III CP data model are discussed below.

The Phase III CP data model further includes several constraints: a guarantee-capacity constraint, a resource balancing constraint, a resource usage constraint, a maximum host usage constraint, per-consumer per-host uninterrupted session constraints, per-host penalty constraints, a penalty sum constraint. Similar constraints have been discussed above with respect to Phase I and/or Phase II. Other constraints of the Phase III CP data model are discussed below.

One or more embodiments include generating a Phase III CP search directive. A Phase III CP search directive includes a minimization objective function associated with a maximum host usage. The Phase III CP search directive may optionally include a minimization objective function associated with a total penalty. Hence, the CP solver may first determine one or more solutions that minimize the maximum host usage. If two solutions are associated with the same maximum host usage, then the CP solver may determine a solution that minimizes the total penalty.

One or more embodiments include successively applying a CP data model and a CP search directive for the different phases to a CP solver. A Phase I CP data model and a Phase I CP search directive is applied to a CP solver to obtain a Phase I solution. The Phase I solution is used to create a Phase II CP data model. The Phase II CP data model and a Phase II CP search directive is applied to a CP solver to obtain a Phase II solution. The Phase I solution and the Phase II solution are used to create a Phase III CP data model. The Phase III CP data model and a Phase III CP search directive is applied to a CP solver to obtain proposed resource guarantee-to-host assignments. A resource manager obtains the proposed resource guarantee-to-host assignments from the CP solver. Based on the proposed assignments, the resource manager designates resources of the hosts to the consumers. The resource manager disallows other consumers from using the resources designated to a particular consumer.

Assignment of resource guarantees to hosts may be continually updated based on updated historical data, which may include an updated set of consumers, an updated set of hosts, and/or more recent telemetric data. Continual assignment updates allow a system of consumers and hosts to quickly adapt to changing resource usage patterns. Optimal assignments determined by a CP solver help to evenly distribute resource usages across the hosts.

One or more embodiments described in this Specification and/or recited in the claims may not be included in this General Overview section.

2. Resource System Architecture

FIG. 1 illustrates a resource manager managing a resource system, in accordance with one or more embodiments. As illustrated in FIG. 1, a resource system 100 includes a resource manager 110, a data repository 102, a set of consumers 108, a set of hosts 112, and a constraint programming (CP) solver 106. The system 100 may be but is not necessarily a computing system. For example, the system 100 may be a cloud computing system. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a consumer 108 is a device, software, object, and/or entity that consumes one or more resources. A consumer 108 generates workload for one or more resources. Examples of consumers 108 include database instances, virtual machines, and/or other hardware and/or software. Workload generated by consumers 108 may be measured by a variety of units, such as, a number of CPUs required, a number of process requests, a volume of data to be communicated and/or stored, and/or a duration of processing time.

In one or more embodiments, a consumer 108 is associated with a total resource guarantee. As illustrated, consumer 108a is associated with total resource guarantee 111a; consumer 108b is associated with total resource guarantee 111b; consumer 108c is associated with total resource guarantee 111c. The term "total resource guarantee" refers to a total number of units of a resource that a consumer is guaranteed to have access to at any given time. Different consumers may be guaranteed different numbers of resources. The total resource guarantee provided to a consumer may derive from a contractual obligation to an owner of the consumer, a technical requirement of the consumer, a user configuration, and/or other factors.

The number of resources that are guaranteed to a consumer are dedicated to the consumer. A resource dedicated to the consumer cannot be used by other consumers. As an example, a cloud environment may include three servers, each with two CPUs, making for a total of 6 CPUs available in the cloud environment. Consumer DB A may be guaranteed 2 CPUs; consumer DB B may be guaranteed 3 CPUs. Hence, out of the 6 CPUs, 2 CPUs are dedicated to DB A, 3 CPUs are dedicated to DB B, and 1 CPU remains to be shared amongst DB A and DB B based on the dynamic demands of DB A and DB B. A consumer requesting to use resources within the consumer's resource guarantee will be granted the request, without needing to compete against other consumers for the requested resources. A consumer requesting to use resources exceeding the consumer's resource guarantee may need to request usage of a resource that is currently in use by another consumer; the requesting consumer may need to wait for the other consumer to give up usage of the resource before being able to make use of the resource. A consumer that uses resources exceeding the consumer's resource guarantee may be interrupted if a resource under use is demanded by another consumer.

In one or more embodiments, a host 112 is a device, software, object, and/or entity that hosts one or more resources. A resource processes workload generated by one or more consumers. An example of a host is a server. Examples of resources of a server include CPUs, disk memory, and/or communication bandwidth.

In one or more embodiments, a host 112 is associated with a resource capacity. As illustrated, host 112a is associated with resource capacity 114a; host 112b is associated with resource capacity 114b; host 112c is associated with resource capacity 114c. The term "resource capacity" refers to the total number of units of a resource hosted by a particular host 112.

Resource guarantees of consumers 108 are assigned to hosts 112. Assignment of a resource guarantee of a particular consumer to a particular host indicates that a resource of the particular host is dedicated to the particular consumer. The sum of the resource guarantees assigned to a host cannot exceed the host's capacity. Referring to the above example, a cloud environment may include three servers, Server X, Server Y, Server Z, and each server may have two CPUs. If the 2 CPUs guaranteed to DB A and the 3 CPUs guaranteed to DB B were all assigned to Server X, Server X would not have enough CPUs to dedicate to each of DB A and DB B. Since Server X has only 2 CPUs, either the 2 CPUs guaranteed to DB A are assigned to Server X, or 1 CPU guaranteed to DB A and 1 CPU guaranteed to DB B are assigned to Server X. The remaining CPUs that are guaranteed to DB A and/or DB B need to be assigned to other servers.

In a shared environment, a set of consumers 108 share a set of resources hosted by a set of hosts 112. For example, in a cloud environment, a set of database instances may share a set of CPUs; the CPUs may be hosted by a set of servers. Further a consumer's resource usage may be split across resources of multiple hosts. Hence, a consumer's resource guarantees may be split across resources of multiple hosts. Referring to the above example, a cloud environment may include three servers, Server X, Server Y, Server Z, and each server may have two CPUs. The resource guarantee of 2 of DB A may be split, such that 1 CPU of Server X is dedicated to DB A, and 1 CPU of Server Y is dedicated to DB A. The resource guarantee of 3 of DB B may be split, such that 1 CPU of Server X is dedicated to DB B, 1 CPU of Server Y is dedicated to DB B, and 1 CPU of Server Z is dedicated to DB B. Hence, 1 CPU of Server Z remains to be shared amongst DB A and DB B.

In one or more embodiments, a resource manager 110 refers to hardware and/or software configured to assign resource guarantees of consumers 108 to resources. A resource manager 110 makes assignments of resource guarantees based on resource guarantee-host assignments 104. Resource guarantee-host assignments 104 indicates a number of resources of each host that are dedicated to each consumer. As illustrated, one resource of host 112a is dedicated to consumer 108a; one resource of host 112b is dedicated to consumer 108a; zero resources of host 112c are dedicated to consumer 108a; zero resources of hosts 112a-b are dedicated to consumer 108b; four resources of host 112c are dedicated to consumer 108b; two resources of host 112a are dedicated to consumer 108c; one resource of host 112b is dedicated to consumer 108c; one resource of host 112c is dedicated to consumer 108c. Examples of operations for applying resource guarantee-host assignments 104 are further described below with reference to FIG. 12.

Additionally or alternatively, a resource manager 110 refers to hardware and/or software configured to monitor a resource system 100. The resource manager 110 may obtain metadata, telemetric data, and/or other data associated with the system 100. The resource manager 110 may take snapshots of the system 100 from time to time. The resource manager 110 may monitor resource usage per consumer per host per time for the system 100. The term "most recent resource usages" refers to resource usage information indicated by the most recently taken snapshot and/or other data associated with the system 100. The term "most recent assignments" refers to assignments of resource guarantees of consumers to hosts indicated by the most recently collected metadata and/or other data associated with the system 100.

In one or more embodiments, a data repository 102 is any type of storage unit and/or device (e.g., a file system, database, collection of tables, or any other storage mechanism) for storing data. Further, a data repository 102 may include multiple different storage units and/or devices. The multiple different storage units and/or devices may or may not be of the same type or located at the same physical site. Further, a data repository 102 may be implemented or may execute on the same computing system as a resource manager 110. Alternatively or additionally, a data repository 102 may be implemented or executed on a computing system separate from a resource manager 110. The data repository 102 may be communicatively coupled to the resource manager 110 via a direct connection or via a network. Information describing resource guarantee-host assignments 104 may be implemented across any of components within the system 100. However, this information is illustrated within the data repository 102 for purposes of clarity and explanation.

In one or more embodiments, a constraint programming (CP) solver 106 refers to hardware and/or software configured to determine a CP solution given a CP data model and a CP search directive. Further embodiments and/or examples of a CP solver 106 are described below with reference to FIG. 2.

Figure 2:
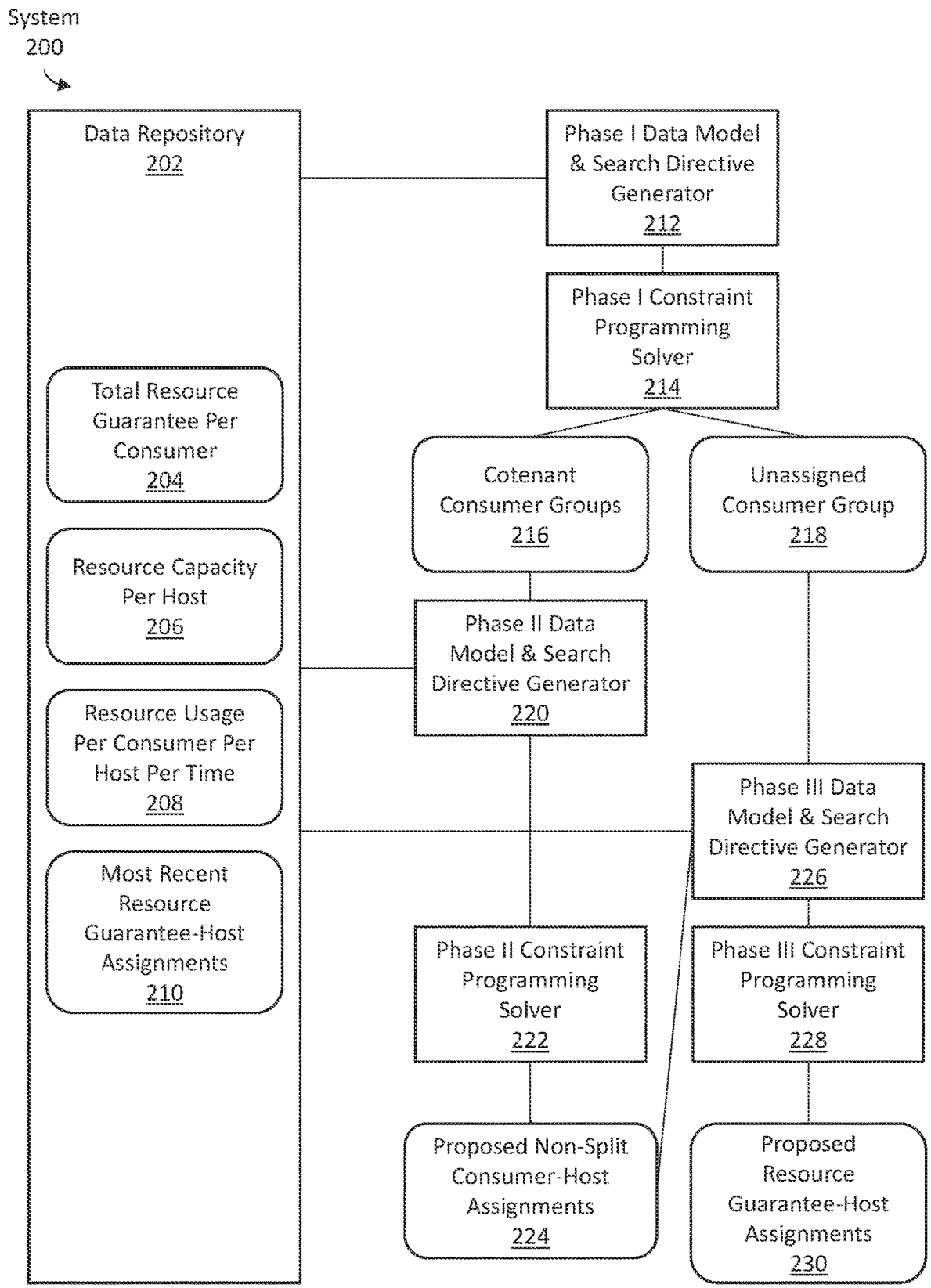
FIG. 2 illustrates a resource guarantee assignment system, including one or more constraint programming solvers, in accordance with one or more embodiments.

In one or more embodiments, system 100 of FIG. 1 and system 200 of FIG. 2 may be combined into a single system configured to manage assignment of resource guarantees to hosts 112. CP solver 106 of FIG. 1 is equivalent to CP solver 214, 222, 228 of FIG. 2. Resource guarantee-host assignments 104 of FIG. 1 (used by resource manager 110) are equivalent to proposed resource guarantee-host assignments 230 of FIG. 2 (output by CP solver 228).

3. Resource Guarantee Assignment System Architecture

FIG. 2 illustrates a resource guarantee assignment system, including one or more constraint programming solvers, in accordance with one or more embodiments. As illustrated in FIG. 2, a resource guarantee assignment system 200 includes a data repository 202, one or more data model and search directive generators 212, 220, 226, and one or more CP solvers 214, 222, 228. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. System 100 of FIG. 1 and system 200 of FIG. 2 may be combined into a single system configured to assign resource guarantees of consumers to resources of hosts.

In one or more embodiments, a data repository 202 is any type of storage unit and/or device (e.g., a file system, database, collection of tables, or any other storage mechanism) for storing data. A data repository 202 may be similar to data repository 102 of FIG. 1. Information describing resource guarantee per consumer 204, resource capacity per host 206, resource usage per consumer per host per time 208, and/or most recent resource guarantee-host assignment 210 may be implemented across any of components within the system 100. However, this information is illustrated within the data repository 102 for purposes of clarity and explanation.

In one or more embodiments, total resource guarantee per consumer 204 refers to a number of resources guaranteed to each consumer in a resource system. Resource capacity per host 206 refers to a number of resources hosted by each host in a resource system. Total resource guarantee per consumer 204 and/or resource capacity per host 206 may be obtained based on configurations and/or metadata for the resource system.

Resource usage per consumer per host per time 208 refers to a number of resources used by each consumer, on each host, at each time at which a snapshot is taken of the consumer. Snapshots may be taken of individual consumers, individual hosts, and/or an entire resource system. Snapshots may be taken in certain time intervals, which may be fixed and/or varying. Each datapoint captured in a snapshot may be an actual measurement and/or aggregated measurement. An actual measurement is an actual measured resource usage at a given point in time. An aggregated measurement refers to a result of some manipulation (such as, a sum or average) of actual measurements over a time window. As an example, a monitoring agent may detect an actual number of CPUs being used every second. Starting at time=0 seconds and ending at time=9 seconds, the actual measurements of CPU usage may be 2, 3, 4, 4, 4, 2, 3, 4, 5, 6. The monitoring agent may determine a running average of the number of CPUs being used every 3 seconds. At time=2, the average is computed based on the actual measurements at time=0, time=1, and time=2. Hence starting at time=2 seconds and ending at time=9 seconds, the average CPU usages may be 3.00, 3.67, 4.00, 3.33, 3.00, 3.00, 4.00, 5.00. The monitoring agent may report the average CPU usages as "aggregated measurements," which may be used as resource usage per consumer per host per time. Resource usage per consumer per host per time 208 may be stored in the form of a log, spreadsheet, and/or any other format. Resource usage may be measured in terms of count (such as a count of CPUs used), volume (such as a volume of memory space used), time (such as a duration in which a communication channel is used), and/or other units.

Most recent resource guarantee-host assignments 210 refers to resource guarantee-to-host assignments indicated by the most recent snapshot and/or metadata associated with the resource system.

In one or more embodiments, a CP data model (such as any of CP data models 302, 312, 322 of FIGS. 3A-C) refers to a particular organization, structure, and/or representation of information. A CP data model declaratively expresses combinatorial properties of a problem in terms of constraints. A CP data model may be implemented as a software data structure. The software data structure is readable by a machine. The CP data model may include a set of data and/or instructions readable by one or more devices including a hardware processor. The CP data model may serve as an input parameter into a hardware and/or software component, such as a CP solver 214, 222, 228.

A CP data model includes one or more data model elements. Each data model element has a respective domain. A data model element cannot be assigned a value that is not within the domain of the data model element. A data model element may be implemented as an array, a vector, a linked list, a table, a software variable, a constant, and/or other software data structures or data objects.

A CP data model includes one or more constraints. A constraint defines combinations of values that are allowed to be assigned to one or more data model elements of the CP data model. Whenever a particular value within a domain of a particular data model element is no longer a possible value for the data model element, based on application of the constraints to the values already assigned to other data model elements, the particular value is removed from the domain of the particular data model element.

In one or more embodiments, a CP search directive indicates one or more priorities associated with finding a solution satisfying the combinatorial properties of a problem expressed in a CP data model. A CP search directive guides the assignment of a set of values to a set of data model elements that satisfies all constraints, as specified by a CP data model. A CP search directive prioritizes the assignment of certain values over other values for one or more data model elements. Different CP search directives for a same CP data model may result in a different CP solution. Additionally or alternatively, different CP search directives for a same CP data model may result in different efficiency levels and/or runtimes for obtaining a CP solution. A CP search directive may be implemented as a software data structure. The CP search directive may include a set of computer-readable instructions. The CP search directive may serve as an input parameter into a hardware and/or software component, such as a CP solver 214, 222, 228. The CP search directive may guide the CP solver in the process of determining an optimal CP solution given a particular CP data model.

In one or more embodiments, a data model and search directive generator (such as any of data model and search directive generators 212, 220, 226) refers to hardware and/or software configured to generate a CP data model and/or CP search directive.

In one or more embodiments, a CP solver (such as any of CP solver 214, 222, 228) refers to hardware and/or software configured to determine a CP solution, given a CP data model and a CP search directive, using constraint programming techniques. Constraint programming techniques include, for example, backtracking algorithms, forward-checking algorithms, and constraint propagation.

A model and directive generator and/or a CP solver is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In one or more embodiments, the problem of assigning resource guarantees of consumers to hosts is divided into three phases. Phase I first segregates the consumers that will not be split and the consumers that may potentially be split. Phase I segregates non-split consumers from split consumers while minimizing maximum host usage. Phase I also identifies which non-split consumers are to be assigned to the same host. Non-split consumers assigned to a same host are referred to herein as a "cotenant consumer group" or "cotenant group." Based on the cotenant groups identified in Phase I, Phase II identifies a specific host for each cotenant group, such that interruption of active sessions when adopting the proposed assignments is minimized. Based on the split consumers identified in Phase I, Phase III determines assignments of resource guarantees of the split consumers to the hosts while minimizing maximum host usage. Examples of operations for a phased-approach to determining and/or updating resource guarantee-host assignments are described below with reference to FIGS. 4A-B. Each phase has a separate CP data model and a separate CP search directive.

In Phase I, a Phase I data model and search directive generator 212 generates a Phase I CP data model and/or Phase I CP search directive. An example of a Phase I CP data model is described below with reference to FIG. 3A; example operations for generating a Phase I CP data model and Phase I CP search directive are described below with reference to FIGS. 5 and 6, respectively. The Phase I CP data model and/or Phase I CP search directive are input into a Phase I CP solver 214. The Phase I CP solver 214 determines a CP solution, which indicates (a) cotenant consumer groups 216 and (b) unassigned consumer group 218. An unassigned consumer group 218 indicates which consumers remain unassigned after Phase I. Consumers within the unassigned consumer group 218 are candidates for being split across different hosts. Consumers within any of cotenant groups 216 may be referred to as "non-split consumers"; consumers within the unassigned consumer group 218 may potentially be split and may be referred to as "spit consumers."

In Phase II, a Phase II data model and search directive generator 220 generates a Phase II CP data model and/or a Phase II CP search directive. The Phase II CP data model is generated based at least on the cotenant consumer groups 216 determined from Phase I. An example of a Phase II CP data model is described below with reference to FIG. 3B; example operations for generating a Phase II CP data model and Phase II CP search directive are described below with reference to FIGS. 7 and 8, respectively. The Phase II CP data model and/or Phase II CP search directive are input into a Phase II CP solver 220. The Phase II CP solver 220 determines a CP solution, which indicates proposed non-split consumer-host assignments 224. Proposed non-split consumer-host assignments 224 refers to proposed assignments of non-split consumers to hosts. An assignment of a non-split consumer to a particular host indicates that all resource guarantees of the non-split consumer are assigned to the particular host.

In Phase III, a Phase III data model and search directive generator 226 generates a Phase III CP data model and/or Phase III CP search directive. The Phase III CP data model is generated based at least on the unassigned consumer groups 218 determined from Phase I and/or the proposed non-split consumer-host assignments 224 determined from Phase II. An example of a Phase III CP data model is described below with reference to FIG. 3C example operations for generating a Phase III CP data model and Phase III CP search directive are described below with reference to FIGS. 9A-B and 10, respectively. The Phase III CP data model and/or Phase III CP search directive are input into a Phase III CP solver 228. The Phase III CP solver 228 determines a CP solution, which indicates proposed resource guarantee-host assignments 230.

Phase I Data Model and Search Directive Generator 212, Phase II Data Model and Search Directive Generator 220, Phase III Data Model and Search Directive Generator 226 may refer to the same data model and search directive generator and/or different data model and search directive generators. Phase I CP solver 214, Phase II CP solver 222, Phase III CP solver 228 may refer to the same CP solver and/or different CP solvers.

4. Constraint Programming Data Models

Figure 3A:
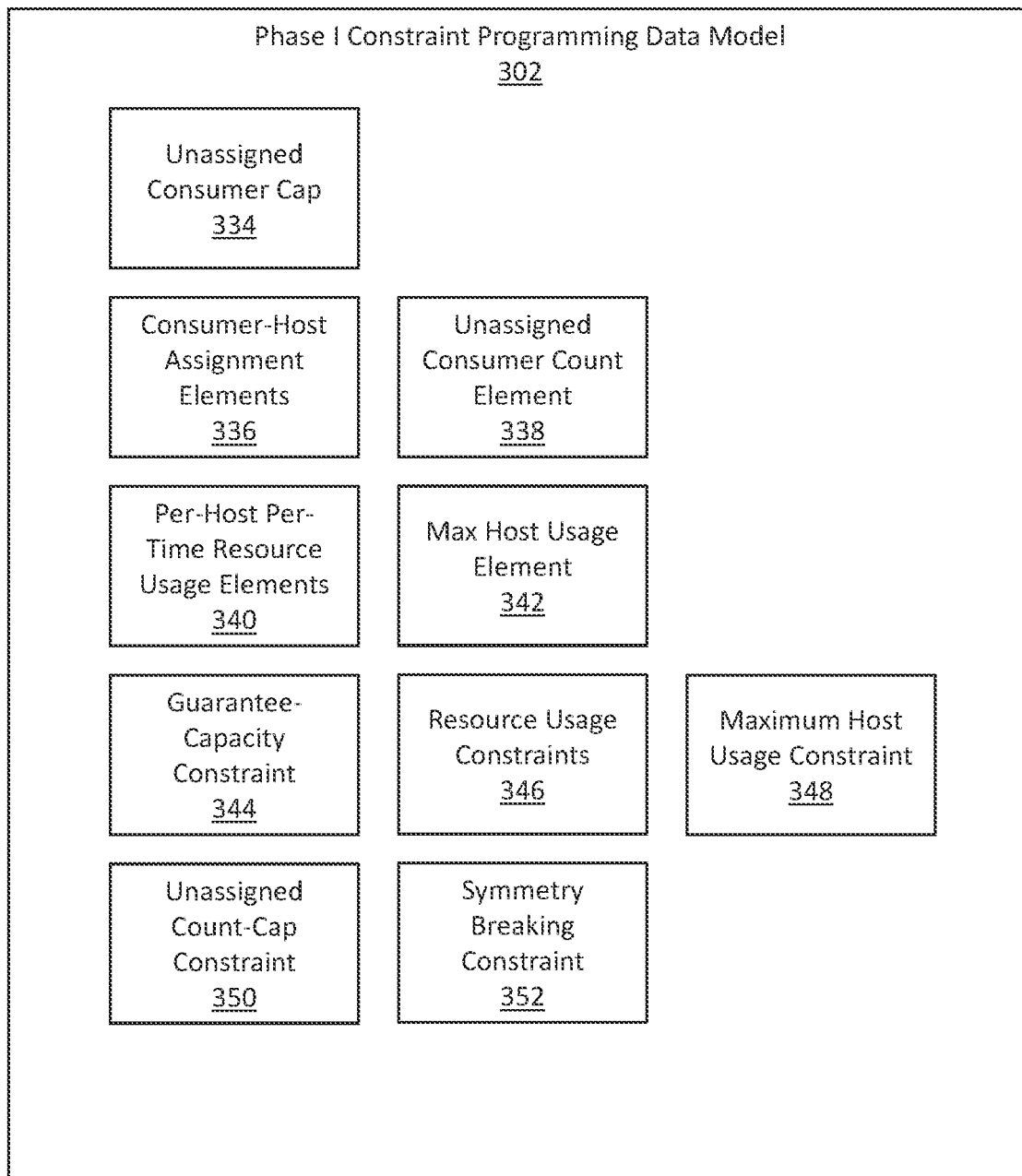
FIGS. 3A-C illustrate constraint programming data models for different phases of a phased-approach for determining resource guarantee-host assignments, in accordance with one or more embodiments.
Figure 3B:
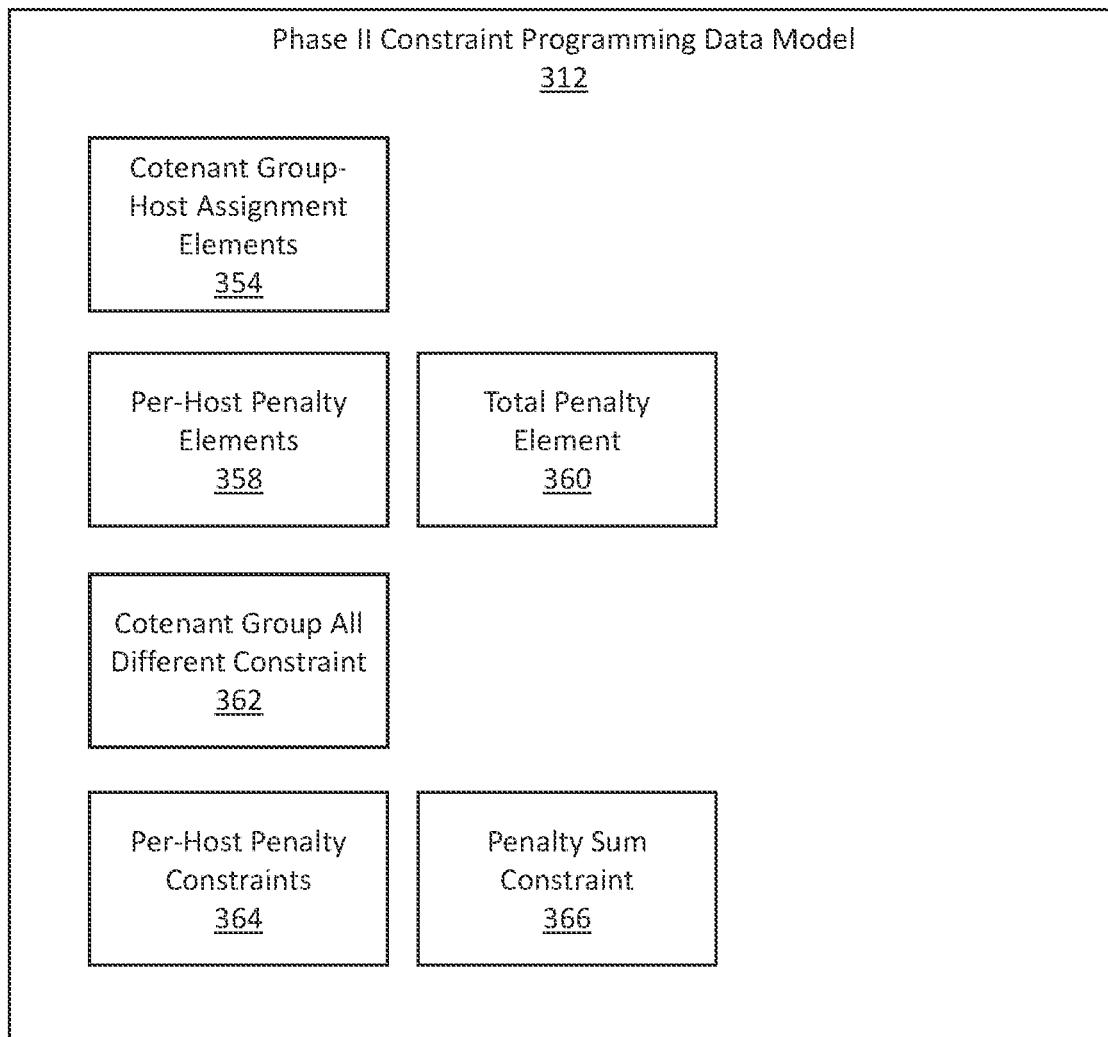
Figure 3C:
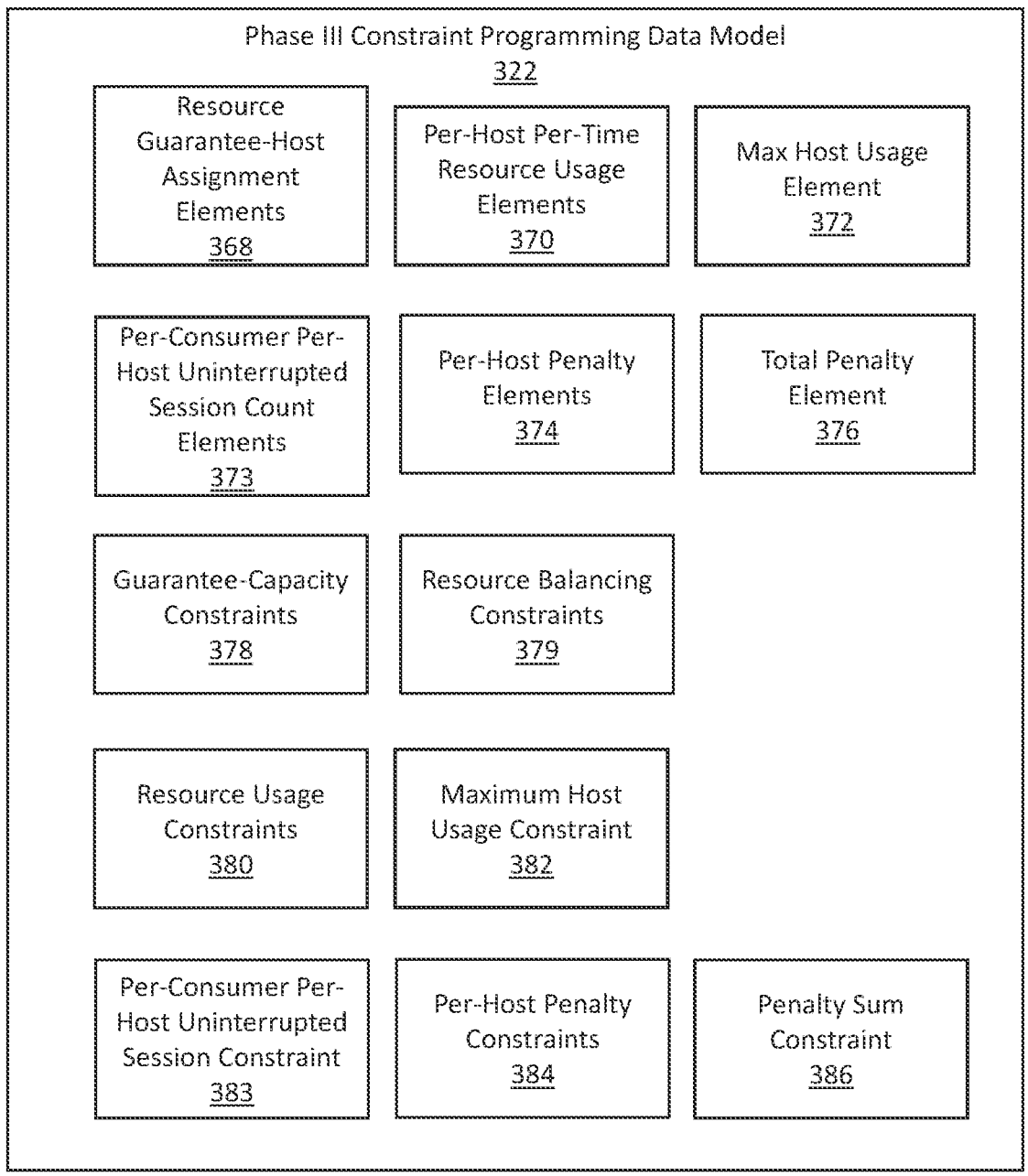

FIGS. 3A-C illustrate constraint programming data models for different phases of a phased-approach for determining resource guarantee-host assignments, in accordance with one or more embodiments.

Referring to FIG. 3A, a Phase I CP data model 302 includes one or more data model elements; and domains of possible values that can be assigned to each data model element.

A set of consumer-host assignment elements 336 represents assignments of consumers to hosts in a resource system. Each consumer-host assignment element 336 corresponds to a respective consumer. A domain of each consumer-host assignment element 336 includes values representing a set of hosts of a resource system, and an extra dummy host. In an embodiment, the hosts are identified using integers ranging from one to the total number of hosts in the resource system. The dummy host is identified using an integer equal to the total number of hosts plus one. Hence the domain of each consumer-host assignment element 336 ranges from one to the total number of hosts plus one. In other embodiments, other identifiers for the hosts and dummy host may be used. A particular value assigned to a consumer-host assignment element 336 represents an assignment of the corresponding consumer to the host identified by the particular value.

An unassigned consumer count element 338 represents a count of consumers that are assigned to the dummy host, and are therefore "unassigned." (Consumers that are unassigned from Phase I will be assigned in Phase III.) A domain of the unassigned consumer count element 338 ranges from zero to an unassigned consumer count cap 334. The unassigned consumer cap 334 is a configuration for Phase I that may be determined manually and/or by another application. A particular value assigned to the unassigned consumer count element 338 indicates that a count of consumers that are unassigned from Phase I is equal to the particular value.

A set of per-host per-time resource usage elements 340 represents hypothetical resource usage per host per time at which a snapshot is taken. Each per-host per-time resource usage element 340 corresponds to a respective host and a respective time. A domain of a per-host per-time resource usage element 340, corresponding to a particular time and a particular host, includes possible combinations of total resource usages of consumers in the resource system at the particular time, capped at the resource capacity of the particular host. A particular value assigned to a per-host per-time resource usage element 340 corresponding to a particular host and a particular time indicates that a sum of the resource usages, at the particular time, of consumers that are assigned to the particular host is equal to the particular value.

As an example, a resource system may include three consumers and two hosts. The historical resource usages per consumer per time may be:

TABLE 1

|  | t1 | t2 |
| --- | --- | --- |
| Consumer A | 3 | 4 |
| Consumer B | 2 | 3 |
| Consumer C | 5 | 6 |

The resource capacities of Host X may be 6, and the resource capacity of Host Y may be 7.

A Phase I CP data model may include a per-host per-time resource usage element corresponding to each host and each time, as follows:

Per-host per-time resource usage element for Host X and t1;

Per-host per-time resource usage element for Host X and t2;

Per-host per-time resource usage element for Host Y and t1;

Per-host per-time resource usage element for Host Y and t2;

The domain of the per-host per-time resource usage elements corresponding to time t1 includes possible combinations of resource usages of consumers in the resource system at time t1, capped at the resource capacity of respective hosts. The possible combinations are:

0 (no consumers)
3 (Consumer A only)
2 (Consumer B only)
5 (Consumer C only)
5 (Consumer A and Consumer B)
7 (Consumer B and Consumer C)
8 (Consumer A and Consumer C)
10 (Consumer A and Consumer B and Consumer C)

The domain of the per-host per-time resource usage elements corresponding to time t1 includes possible combinations of resource usages of consumers in the resource system at time t1, capped at the resource capacity of respective hosts. The possible combinations are:

0 (no consumers)
3 (Consumer B)
4 (Consumer A)
6 (Consumer C)
7 (Consumer A and Consumer B)
9 (Consumer B and Consumer C)
10 (Consumer A and Consumer C)
13 (Consumer A and Consumer B and Consumer C)

Hence, the per-host per-time resource usage element for t1 and Host X would be the above combinations for t1 capped at the resource capacity of 6: [0, 2, 3, 5].

The per-host per-time resource usage element for t1 and Host Y would be the above combinations for t1 capped at the resource capacity of 7: [0, 2, 3, 5, 7].

Similarly, the per-host per-time resource usage element for Host X and t2 would be the above combinations for t2 capped at the resource capacity of 6: [0, 3, 4, 6]

The per-host per-time resource usage element for Host Y and t2 would be the above combinations for t2 capped at the resource capacity of 7: [0, 3, 4, 6, 7].

A maximum host usage element 342 represents a maximum value of the resource usage per host per time. A domain of the maximum host usage element 342 includes every value in the domains of the set of per-host per-time resource usage elements 340. A particular value assigned to a maximum host usage element 342 indicates that a maximum value of the resource usage per host per time is equal to the particular value.

Referring to the example above, a domain of a maximum host usage element would be [0, 2, 3, 4, 5, 6, 7].

In one or more embodiments, a Phase I CP data model 302 includes several constraints.

A guarantee-capacity constraint 344 requires that a sum of the resource guarantees of consumers assigned to each host be less than or equal to the resource capacity of the host. A guarantee-capacity constraint may be expressed as a bin packing constraint. A bin packing constraint accepts three inputs: an assignment element representing assignment of items to bins, size of the items, capacity of the bins. The bin packing constraint requires that the items are packed into the bins, while the total size of the items assigned to each bin is equal to or less than the capacity of the bin. In particular, a guarantee-capacity constraint 344 expressed as a bin packing constraint accepts the following inputs: the set of consumer-host assignment elements 336, resource guarantees of the consumers, and the set of per-host per-time resource usage elements 340. Hence, the assignment elements 336 keep track of which consumers are assigned to which hosts, while ensuring that the total resource guarantees of consumers assigned to each host is equal to or less than the resource capacity of the host.

A set of resource usage constraints 346 requires that a sum of hypothetical resource usages, at each time, of the consumers on each host be less than or equal to the resource capacity of the host. Each resource usage constraint 346 corresponds to a respective time. A resource usage constraint 346 may be expressed as a bin packing constraint. In particular, a resource usage constraint 346 corresponding to a particular time, and expressed as a bin packing constraint, accepts the following inputs: the set of consumer-host assignment elements 336, resource usages of the consumers at the particular time, and the set of per-host per-time resource usage elements 340. Hence, the assignment elements 336 keep track of which consumers are assigned to which hosts, while ensuring that the total hypothetical resource usages pertaining to the particular time and the consumers assigned to each host is equal to or less than the resource capacity of the host.

A maximum host usage constraint 348 requires that a maximum of the per-host per-time resource usages 340 be equal to a maximum host usage. The per-host per-time resource usage corresponding to a particular host and a particular time is the sum of the resource usages, at the particular time, of consumers assigned to the particular host. The per-host per-time resource usages for each host and each time are determined and stored into a data structure, such as a vector or an array. The maximum host usage constraint 348 requires that the maximum value from the vector of per-host per-time resource usages be equal to the maximum host usage element 342.

An unassigned count-cap constraint 350 requires that an unassigned consumer count element 338 keep track of a count of consumers assigned to the dummy host. Each time a consumer is assigned to the dummy host, a lowest value within the domain of the unassigned consumer count element 338 is removed.

A symmetry breaking constraint 352 enforces a fixed sequence for the traversal of resources and hosts during the assignment process. A next assignment of a consumer must be to either a host that has already been assigned to before or a next unassigned host. In an embodiment, a threshold variable keeps track of the identifier of the last host in the sequence that has been assigned. A first consumer in the sequence is assigned to a first host in the sequence. The threshold variable assumes a value of 1. Thereafter, the consumers are traversed in increasing order according to the sequence. A current consumer being processed must be assigned to a host whose identifier is less than or equal to the threshold variable plus one (that is, the identifier of the next host to which no consumers have been assigned yet). Based on the LE constraint, the current consumer must be assigned to (a) a host that has been assigned to (having an identifier less than or equal to the threshold variable) or (b) a next host to which no consumers have been assigned yet (having an identifier equal to the threshold variable plus one). In another embodiment, a threshold variable keeps track of the identifier of the first host in the sequence that has been assigned. A first consumer in the sequence is assigned to a last host in the sequence or the dummy host. The threshold variable assumes a value equal to the number representing the host to which the first consumer was assigned. Thereafter, the consumers are traversed in increasing order according to the sequence. A current consumer being processed must be assigned to a host whose identifier is greater than or equal to the threshold variable minus one (that is, the identifier of the next host to which no consumers have been assigned yet). Based on the greater-than-or-equal-to (GE) constraint, the current consumer must be assigned to (a) a host that has been assigned to (having an identifier greater than or equal to the threshold variable) or (b) a next host to which no consumers have been assigned yet (having an identifier equal to the threshold variable minus one).

If the consumers' active sessions on the hosts are ignored, the assignment problem of Phase I includes a large number of symmetrically identical solutions. Different ways of assigning a given set of cotenant groups to the hosts constitute symmetric solutions. The symmetry breaking constraint 352 removes at least some of a set of symmetric solutions from the search space while preserving the existence of at least one of the set of symmetric solutions, thereby increasing the efficiency of Phase I, and the problem of assigning resource guarantees to hosts as a whole.

Referring to FIG. 3B, a Phase II CP data model 312 includes one or more data model elements; and domains of possible values that can be assigned to each data model element.

A set of cotenant group-host assignment elements 354 represents assignments of cotenant consumer groups to hosts in a resource system. The cotenant consumer groups are determined from Phase I; consumers assigned to a same host from Phase I are referred to as being in a "cotenant consumer group" or "cotenant group." Each cotenant group-host assignment element 354 corresponds to a respective cotenant group. A domain of each cotenant group-host assignment element 354 represents the hosts of the resource system. In an embodiment, the hosts are identified using integers ranging from one to the total number of hosts in the resource system. Hence the domain of each cotenant group-host assignment elements 354 ranges from one to the total number of hosts. A particular value assigned to a cotenant group-host assignment element 354 represents an assignment of the corresponding cotenant group to the host identified by the particular value.

A set of per-host penalty elements 358 represents a penalty incurred for each host, when moving from the most recent assignments to the proposed assignments indicated by the set of cotenant group-host assignment elements 354. One "penalty" corresponds to each active session that is interrupted when adopting the proposed assignments. An active session is interrupted when the session can no longer be served after adopting of the proposed assignments. Each per-host penalty element 358 corresponds to a respective host. A domain of a per-host penalty element 358 of a particular host ranges from zero to the total number of active sessions on the particular host. A particular value assigned to a per-host penalty element 358 corresponding to a particular host indicates that a count of the interrupted sessions for the particular host is equal to the particular value.

A total penalty element 360 represents a total penalty incurred by all hosts in the resource system, when moving from the most recent assignments to the proposed assignments indicated by the set of cotenant group-host assignment elements 354. A domain of the total penalty element 360 ranges from zero to a total number of active sessions. A particular value assigned to the total penalty element 360 indicates that a total penalty for moving from the most recent assignments to the proposed assignments is equal to the particular value.

In one or more embodiments, a Phase II CP data model 312 includes several constraints.

A cotenant group all different constraint 362 requires that each cotenant group be assigned to a different host. Hence, if a particular cotenant group is assigned to a particular host, no other cotenant group can be assigned to the particular host.

A set of per-host penalty constraints 364 requires that the penalty of each host be equal to the number of interrupted sessions of the host, when adopting the proposed assignments indicated by the cotenant group-host assignment elements 354. The number of interrupted sessions of a particular host is equal to the number of interrupted sessions of all consumers on the particular host. Since the proposed assignments in Phase II involve non-split consumers only, the number of interrupted sessions of a particular consumer on a particular host to which the particular consumer is assigned is zero; the number of interrupted sessions of the particular consumer on each other host to which the particular consumer is not assigned is equal to the number of active sessions on the respective host as indicated by the telemetric data. Therefore, a per-host penalty constraint of each host would be:

$P_j = \Sigma \text{intsess}_{i,j}$, where $\text{intsess}_{i,j} = 0$, for $A_{c\ of\ i} = j$, and $\text{intsess}_{i,j}$ = number of active session of consumer$_i$ on host$_j$, for $A_{c\ of\ i} \neq j$.

where:
i refers to a respective consumer, j refers to a respective host;
$P_j$ refers to a per-host penalty element 358 corresponding to host$_j$;
$\text{int}_{i,j}$ refers to a number of interrupted sessions for consumer$_i$ on host$_j$;
the summation is performed across all consumers;
$A_{c\ of\ i}$ refers to the cotenant group-host assignment element 354 corresponding to the cotenant group including consumer.

As an example, active sessions of Databases (DB) A-C across Hosts X-Z may be as follows:

TABLE 2

|      | Host X | Host Y | Host Z |
|------|--------|--------|--------|
| DB A | 3      | 2      | 2      |
| DB B | 0      | 0      | 6      |
| DB C | 1      | 0      | 1      |

Proposed assignments may assign resource guarantees of DB A to Host X, resource guarantees of DB B to Host Z, and resource guarantees of DB C to Host X. Therefore, the active sessions of DB A on Host Y and Host Z are interrupted. The active sessions of DB B on Host X and Host Y are interrupted. The active sessions of DB C on Host Y and Host Z are interrupted. The number of interrupted sessions per consumer per host would be as follows:

TABLE 3

|      | Host X | Host Y | Host Z |
|------|--------|--------|--------|
| DB A | 0      | 2      | 2      |
| DB B | 0      | 0      | 0      |
| DB C | 0      | 0      | 1      |

TABLE 3-continued

|      | Host X | Host Y | Host Z |
|------|--------|--------|--------|
| DB B | 0      | 0      | 0      |
| DB C | 0      | 0      | 1      |

Finally, the per-host penalty would be as follows:

TABLE 4

| Host X | Host Y | Host Z |
|--------|--------|--------|
| 0      | 2      | 3      |

A penalty sum constraint 366 requires that a total penalty incurred for moving from the most recent assignments to the proposed assignments indicated by the cotenant group-host assignment elements 354 be equal to a sum of the penalties of all hosts in the resource system. The penalty sum constraint 366 requires that the total penalty element 360 be a sum of the per-host penalty elements 358 across all hosts.

Referring to FIG. 3C, a Phase III CP data model 322 includes one or more data model elements; and domains of possible values that can be assigned to each data model element.

A set of resource guarantee-host assignment elements 368 represents assignments of resource guarantees of consumers to hosts in a resource system. Each resource guarantee-host assignment element 368 corresponds to a respective consumer and a respective host. A domain of a resource guarantee-host assignment element 368 corresponding to a particular consumer and a particular host represents a number of resource guarantees of the particular consumer that are assigned to the particular host. Domains of non-split consumers and split consumers, as determined in Phase I, are determined differently. For a particular non-split consumer, the assigned host is determined in Phase II. The domain of the resource guarantee-host assignment element corresponding to a non-split consumer (from Phase I) and an assigned host for the non-split consumer (from Phase II) is the total number of resource guarantees of the non-split consumer; the domain of each resource guarantee-host assignment element corresponding to the non-split consumer (from Phase I) and each remaining host is zero. In contrast, the domain of each resource guarantee-host assignment element 368 corresponding to a split consumer ranges from zero to the total number of resources guaranteed to the split consumer. A particular value assigned to a resource guarantee-host assignment element 368 corresponding to a particular consumer and a particular host indicates that a number of resources of the particular host that are dedicated to the particular consumer is equal to the particular value.

A set of per-host per-time resource usage elements 370 represents hypothetical resource usage per host per time at which a snapshot is taken. Each per-host per-time resource usage element 370 corresponds to a respective host and a respective time. A domain of a per-host per-time resource usage element 370, corresponding to a particular time and a particular host, ranges from zero to the sum of resource usages at the particular time of all consumers in the resource system, capped at the resource capacity of the particular host. A particular value assigned to a per-host per-time resource usage element 370 corresponding to a particular host and a particular time indicates that a sum of the resource usages, at the particular time, corresponding to resource guarantees of consumers that are assigned to the particular host is equal to the particular value.

A maximum host usage element 372 represents a maximum value of the resource usage per host per time. A domain of the maximum host usage element 372 ranges from zero to the maximum value in the domains of the set of per-host per-time resource usage elements 370. A particular value assigned to a maximum host usage element 372 indicates that a maximum value of the resource usage per host per time is equal to the particular value.

A set of per-consumer per-host uninterrupted session count elements 373 represents counts of uninterrupted sessions for each consumer on each host, in the proposed assignments indicated by the set of resource guarantee-host assignment elements 368 as compared with the most recent assignments. Each per-host uninterrupted session count element 373 corresponds to a respective consumer and a respective host. A domain of per-consumer per-host uninterrupted session count element 373 of a particular consumer and a particular host ranges from zero to the number of active sessions of the particular consumer on the particular host. A particular value assigned to a per-consumer per-host uninterrupted session count element 373 corresponding to a particular consumer and a particular host indicates that a count of the uninterrupted sessions for the particular consumer on the particular host is equal to the particular value.

As an example, active sessions in a resource system may be:

TABLE 5

|      | Host X | Host Y | Host Z |
|------|--------|--------|--------|
| DB A | 4      | 5      | 3      |
| DB B | 2      | 6      | 4      |

Hence, the set of per-consumer per-host uninterrupted session count elements corresponding to the various consumers and hosts would have domains as follows:

TABLE 6

|      | Host X       | Host Y             | Host Z       |
|------|--------------|--------------------|--------------|
| DB A | [0, 1, 2, 3, 4] | [0, 1, 2, 3, 4, 5]    | [0, 1, 2, 3]    |
| DB B | [0, 1, 2]    | [0, 1, 2, 3, 4, 5, 6] | [0, 1, 2, 3, 4] |

A set of per-host penalty elements 374 represents a penalty incurred for each host, when moving from the most recent assignments to the proposed assignments indicated by the set of resource guarantee-host assignment elements 368. Per-host penalty elements 374 are similar to per-host penalty elements 358, described above.

A total penalty element 376 represents a total penalty incurred for all hosts in the resource system, when moving from the most recent assignments to the proposed assignments indicated by the set of resource guarantee-host assignment elements 368. Total penalty element 376 is similar to total penalty element 360, described above.

In one or more embodiments, a Phase III CP data model 322 includes several constraints.

A set of guarantee-capacity constraints 378 requires that a sum of resource guarantees assigned to each host be equal to or lesser than the resource capacity of the host. Each guarantee-capacity constraint 378 corresponds to a respective host. A guarantee-capacity constraint 378 corresponding to a particular host requires that the sum of the resource guarantee-host assignment elements 368, corresponding to the particular host and each consumers, is less than or equal to the resource capacity of the particular host.

A set of resource balancing constraints 379 requires that all resource guarantees of a consumer are assigned to a single host, or the resource guarantees of the consumer are as evenly distributed across the hosts as possible. Each resource balancing constraint 379 corresponds to a respective consumer. A particular resource balancing constraint 379, corresponding to particular consumer, requires that each resource guarantee-host assignment element corresponding to the particular consumer be equal to one of: (a) the maximum of the resource guarantee-host assignment elements corresponding to the particular consumer, (b) the maximum of the resource guarantee-host assignment elements corresponding to the particular consumer minus one, and (c) zero. Hence, if the consumer is split, the resource guarantee-host assignments of a same consumer across all hosts may differ at most by one.

A set of resource usage constraints 380 requires that a sum of hypothetical resource usages, at each time, on each host, be less than or equal to the resource capacity of the host. Each resource usage constraint 380 corresponds to a respective host and a respective time. A hypothetical resource usage by a particular consumer on a particular host at a particular time is determined based on a usage factor. The "usage factor" is the total resource usages of the particular consumer at the particular time (obtained from telemetric data) divided by the total resource guarantees of the particular consumer. Hence, the hypothetical usage may be determined as follows:

$$\text{Hypothetical Resource Usage}_{i,j,t} = \frac{\text{Actual Resource Usages}_{i,t}}{\text{Total Resource Guarantee}_i} \times \text{Resource Guarantee-Host Assignment Element}_{i,j}$$

where:
i refers to a respective consumer, j refers to a respective host, and t refers to a respective time; Hypothetical Resource Usage$_{i,j,t}$ refers to hypothetical resource usage by consumer$_i$ on host$_j$ at time$_t$;
Actual Resource Usages$_{i,t}$ refers to a sum of actual resource usages by consumer$_i$ on all hosts at time$_t$;
Total Resource Guarantee$_i$ refers to a total number of resource guarantees of consumer$_i$;
Resource Guarantee-Host Assignment Element$_{i,j}$ refers to the number of resource guarantees of consumer$_i$ that is assigned to host$_j$.

A maximum host usage constraint 382 requires that a maximum of the per-host per-time resource usages be equal to a maximum host usage. The per-host per-time resource usage corresponding to a particular host and a particular time is the sum of the resource usages, at the particular time, of consumers assigned to the particular host. The per-host per-time resource usages for each host and each time are determined and stored into a data structure, such as a vector or an array. The maximum host usage constraint 348 requires that the maximum value from the vector of per-host per-time resource usages be equal to the maximum host usage element 372.

A set of per-consumer per-host uninterrupted session constraints 383 requires that the uninterrupted session count of each consumer on each host be equal to a minimum of (a) the number of active sessions of the consumer on the host (obtained from telemetric data) and (b) the number of hypothetical sessions of the consumer on the host when adopting the proposed assignments indicated by the resource guarantee-host assignment elements 368. The number of hypothetical sessions of the consumer on the host after adoption of the proposed assignments is the product of (a) a "session factor" of the consumer and (b) the number of resource guarantees of the consumer that are assigned to the host. The "session factor" is the total number of active sessions of the consumer (obtained from telemetric data) divided by the total resource guarantees of the consumer. Therefore, the per-consumer per-host uninterrupted session constraint of each consumer and each host would be:

$$U_{i,j} = \frac{\text{Total Active Sessions}_i}{\text{Total Resource Guarantee}_i} \times \text{Resource Guarantee-Host Assignment Element}_{i,j}$$

where:
i refers to a respective consumer, j refers to a respective host;
$U_{i,j}$ refers to a per-consumer per-host uninterrupted session count element 373 corresponding to consumer$_i$ and host$_j$;
Total Active Sessions$_i$ refers to a sum of active sessions of consumer, on all hosts;
Total Resource Guarantee$_i$ refers to a total number of resource guarantees of consumer$_i$;
Resource Guarantee-Host Assignment Element$_{i,j}$ refers to the number of resource guarantees of consumer, that is assigned to host$_j$.

As an example, active sessions of Databases (DB) A-C across Hosts X-Z may be as follows:

TABLE 7

|       | Host X | Host Y | Host Z |
|-------|--------|--------|--------|
| DB A  | 3      | 3      | 2      |
| DB B  | 0      | 0      | 6      |
| DB C  | 2      | 1      | 1      |

Proposed assignments of resource guarantees to hosts may be:

TABLE 8

|       | Host X | Host Y | Host Z |
|-------|--------|--------|--------|
| DB A  | 2      | 1      | 1      |
| DB B  | 1      | 1      | 1      |
| DB C  | 0      | 3      | 0      |

The session factor for DB A would be (3+3+2)/(2+1+1)=8/4=2. The session factor for DB B would be (6)/(1+1+1)=6/3=2. The session factor for DB C would be (2+1+1)/(0+3+0)=4/3=1.3333.

Hence, hypothetical sessions of DBs A-C across Hosts X-Z according to proposed assignments may be as follows:

TABLE 9

|       | Host X        | Host Y        | Host Z        |
|-------|---------------|---------------|---------------|
| DB A  | 4 (2 × 2)     | 2 (1 × 2)     | 2 (1 × 2)     |
| DB B  | 2 (1 × 2)     | 2 (1 × 2)     | 2 (1 × 2)     |

TABLE 9-continued

|       | Host X        | Host Y        | Host Z        |
|-------|---------------|---------------|---------------|
| DB C  | 0 (0 × 1.333) | 4 (3 × 1.333) | 0 (0 × 1.333) |

Therefore, the number of uninterrupted sessions of DBs A-C across Hosts X-Z according to proposed assignments may be as follows:

TABLE 10

|       | Host X             | Host Y             | Host Z             |
|-------|--------------------|--------------------|--------------------|
| DB A  | 3 (min of 3 and 4) | 2 (min of 3 and 2) | 2 (min of 2 and 2) |
| DB B  | 0 (min of 0 and 2) | 0 (min of 0 and 2) | 2 (min of 6 and 2) |
| DB C  | 0 (min of 2 and 0) | 1 (min of 1 and 4) | 0 (min of 1 and 0) |

A set of per-host penalty constraints 384 requires that the penalty of each host be equal to the total number of active sessions of each host minus the total number of uninterrupted session of each host. The total number of uninterrupted sessions for a particular host is the sum of the uninterrupted session counts of all consumers on the particular host. Hence, the per-host penalty constraint of each host is:

$$P_j = \text{Total Active Sessions}_j - \Sigma U_{i,j}$$

where:
i refers to a respective consumer, j refers to a respective host;
$P_j$ refers to a per-host penalty element 374 corresponding to host$_j$;
Total Active Sessions$_j$ refers to a sum of active sessions of all consumers on host$_j$;
$U_{i,j}$ refers to a per-consumer per-host uninterrupted session count element 373 corresponding to consumer, and host$_j$;
the summation is across all consumers.

Referring to the example above, the total active sessions for Host X is 5; the total active sessions for Host Y is 4; the total active sessions for Host Z is 9. The per-host penalty would be as follows:

TABLE 12

| Host X   | Host Y   | Host Z   |
|----------|----------|----------|
| 2 (5 − 3)| 1 (4 − 3)| 5 (9 − 4)|

A penalty sum constraint 386 requires that a total penalty incurred for moving from the most recent assignments to the proposed assignments indicated by the resource guarantee-host assignment elements 368 be equal to a sum of the penalties of all hosts in the resource system. The penalty sum constraint 386 requires that the total penalty element 376 be a sum of the per-host penalty elements 374 across all hosts.

5. A Phased-Approach to Determining and Updating Resource Guarantee-Host Assignments One or more operations illustrated in FIGS. 4A-B may be modified, rearranged, and/or omitted all together. Accordingly, the particular sequence of operations illustrated in FIGS. 4A-B should not be construed as limiting the scope of one or more embodiments.

Figure 4A:
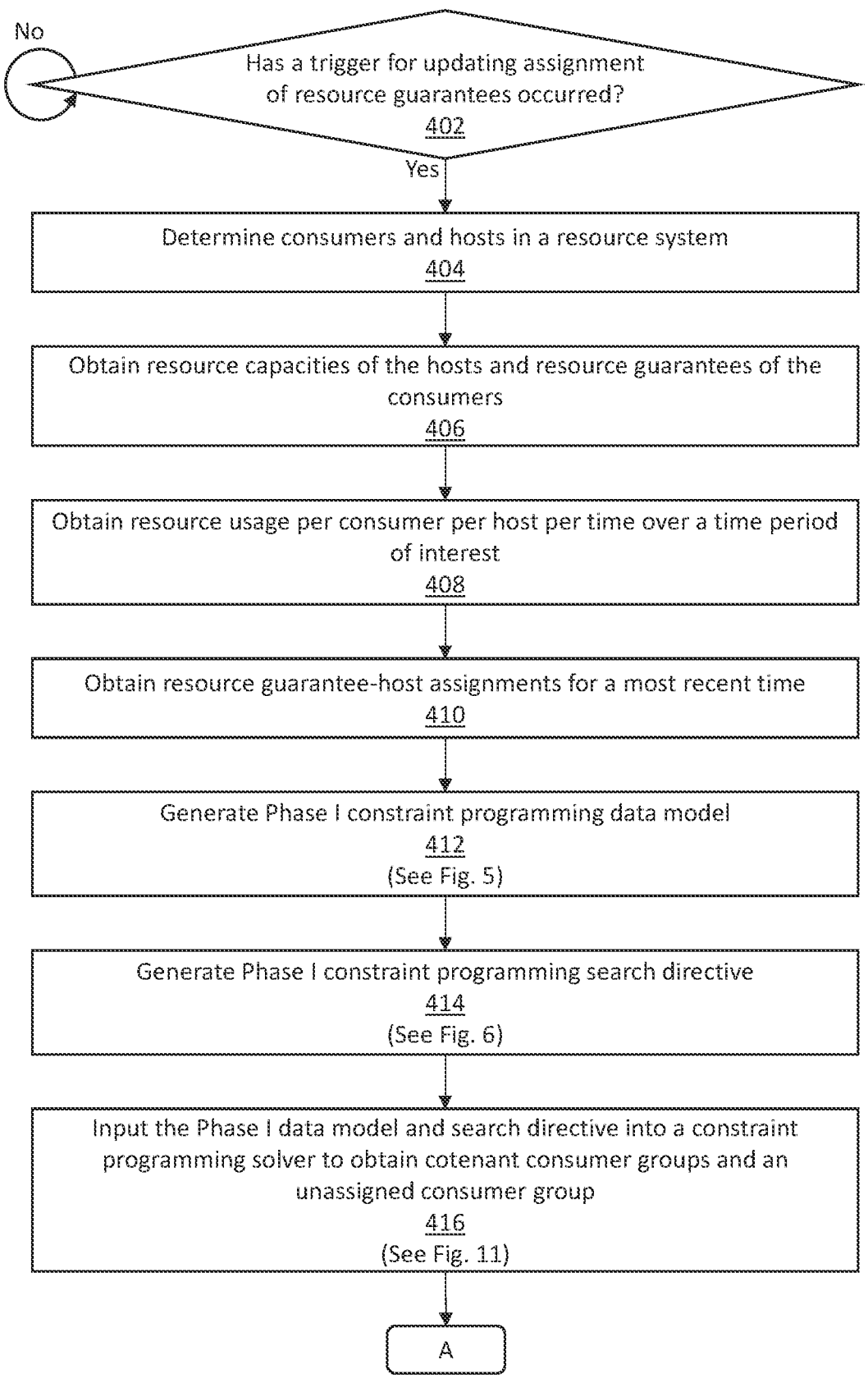
FIGS. 4A-B illustrate an example set of operations for a phased-approach to determining and/or updating resource guarantee-host assignments, based on historical resource usage, in accordance with one or more embodiments.
Figure 4B:
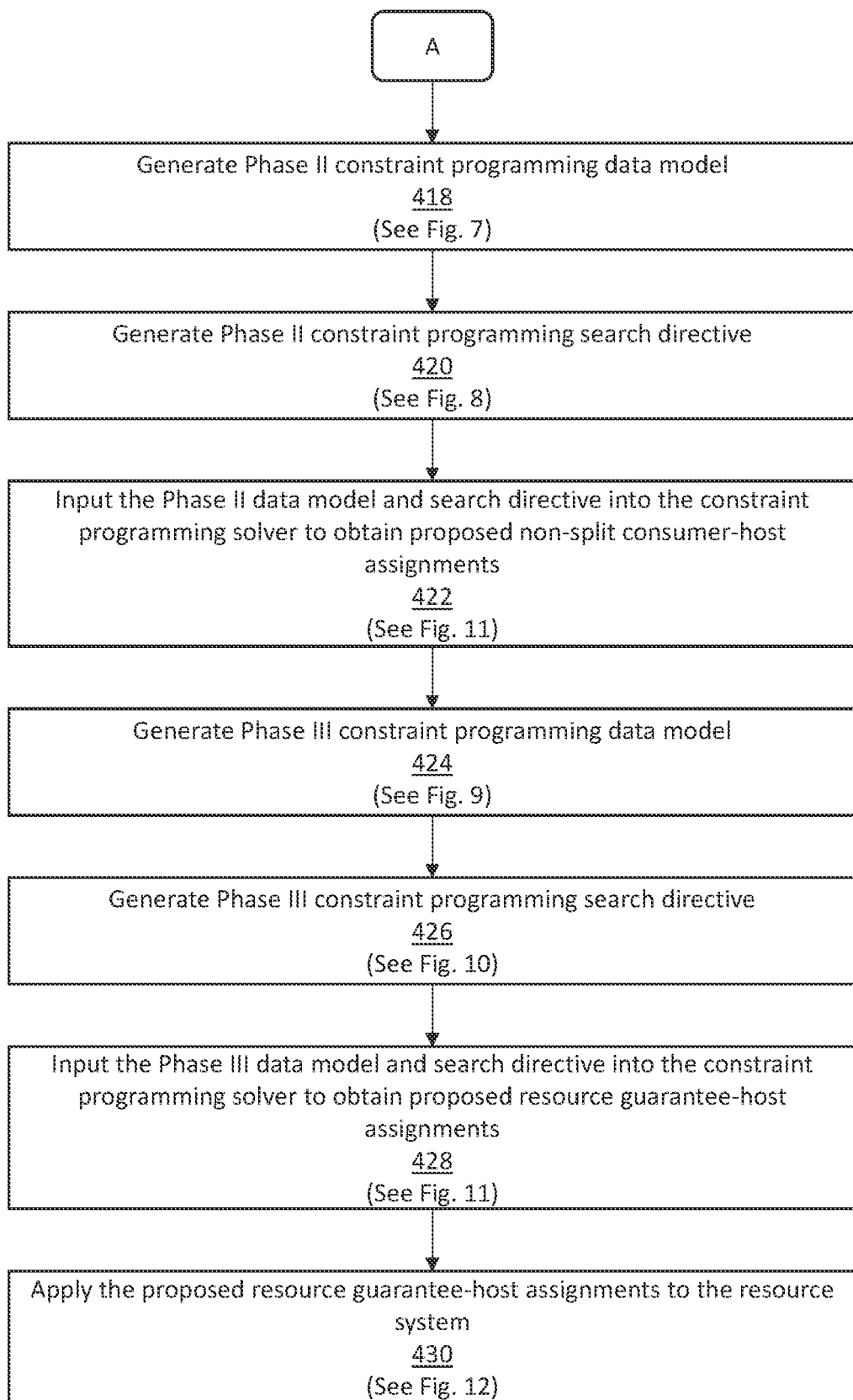

FIGS. 4A-B illustrate an example set of operations for a phased-approach to determining and/or updating resource guarantee-host assignments, based on historical resource usage, in accordance with one or more embodiments.

One or more embodiments include determining whether a trigger for updating assignment of resource guarantees has occurred (Operation 402). A resource manager (such as resource manager 110 of FIG. 1, and/or any other component of FIGS. 1-2) determines whether a trigger for updating assignments of resource guarantees to hosts has occurred. A trigger may be based on a schedule. As an example, a schedule may specify that resource guarantee assignments should be updated every three hours. Additionally or alternatively, a trigger may be based on workloads of one or more consumers in a computing system. As an example, a trigger may be the workload of a consumer exceeding a threshold value. Another trigger may be the total workload of consumers exceeding another threshold value. Additional and/or alternative triggers may be used. If a trigger has occurred, the resource manager may notify a model and directive generator (such as Phase I data model and search directive generator 212 of FIG. 2).

One or more embodiments include determining consumers and hosts in a resource system (Operation 404). The resource manager tracks consumers and hosts in a resource system via a notification system, a heartbeat system, log files, telemetric data, and/or other approaches. The resource manager provides the identities of the consumers and hosts to the model and directive generator.

One or more embodiments include obtaining resource capacities of the hosts and resource guarantees of the consumers (Operation 406). The model and directive generator obtains metadata and/or telemetric data associated with the resource system. The model and directive generator determines resource capacities of the hosts and resource guarantees of the consumers based on the metadata and/or telemetric data.

One or more embodiments include obtaining resource usage per consumer per host per time over a time period of interest (Operation 408). The resource manager monitors resource usage of the consumers. In an embodiment, the resource manager generates snapshots of the resource system. Based on the snapshots, the resource manager detects, aggregates, measures and/or otherwise obtains resource usage per consumer per host per time. The resource manager provides the resource usage per consumer per host per time to the model and directive generator.

In an embodiment, in each iteration of the operations for updating resource guarantee assignments, the model and directive generator uses information associated with the resource system from a most recent historical time period of interest. For example, each execution of the operation to obtain resource usage per consumer per host per time may include obtaining resource usage data from the last ten minutes. Hence, the model and directive generator generates a CP data model based on the most recent historical information associated with the resource system. Therefore, resource guarantee assignments are adaptively updated based on changing resource usage of the consumers of the resource system.

As an example, resource guarantee assignments for a resource system may be updated once per hour. A first iteration of a process to determine resource guarantee assignments may occur at Jan. 1, 2021, 11:00 am. A model and directive generator may generate a CP data model based on resource usage data from Jan. 1, 2021, 10:00 am to 10:59 am. Hence, resource guarantee assignments may be determined based on the resource usage data from 10:00 am to 10:59 am. A second iteration of the process may occur at Jan. 1, 2021, 12:00 μm. The model and directive generator may generate a new CP data model based on resource usage data from Jan. 1, 2021, 11:00 am to 11:59 am. Hence, resource guarantee assignments may be determined based on the resource usage data from 11:00 am to 11:59 am. Therefore, resource guarantee assignments may be continually updated to be most optimal based on the most recent resource usage.

In an embodiment, in each iteration of the operations for updating resource guarantee assignments, the model and directive generator uses predictions of resource usage for an upcoming future time period. Resource usage predictions may be based on (a) resource usage datasets from a most recent historical time period, (b) resource usage datasets from a historical time period sharing a characteristic with the upcoming time period, and/or (c) other factors. A historical time period sharing a characteristic with the upcoming time period may be, for example, a historical time period associated with the same time of day, day of week, and/or day of month as the upcoming time period. Therefore, the resource guarantee assignments are adaptively updated based on predictions of resource usage of the consumers of the resource system.

One or more embodiments include obtaining resource guarantee-host assignments for a most recent time (Operation 410). The resource manager obtains resource guarantee-host assignments for a most recent time at which the assignment data is available. The resource manager provides the resource guarantee-host assignments to the model and directive generator.

As an example, at 10:58 am, a resource manager may determine a current set of resource guarantee-host assignments. The resource manager may provide the resource guarantee-host assignments to a model and directive generator. At 11:00 am, the model and directive generator may generate a CP data model. The CP data model would be generated based on resource guarantee-host assignments at 10:58 am, which is the most recent time at which the assignment data is available.

One or more embodiments include generating a Phase I CP data model (Operation 412). The model and directive generator generates a Phase I CP data model. Examples of operations for generating a Phase I CP data model are further discussed below with reference to FIG. 5.

One or more embodiments include generating a Phase I CP search directive (Operation 414). The model and directive generator generates a Phase I CP search directive. Examples of operations for generating a Phase I CP search directive are further discussed below with reference to FIG. 6.

One or more embodiments include inputting the Phase I CP data model and Phase I CP search directive into a CP solver to obtain cotenant consumer groups and an unassigned consumer group (Operation 416). The model and directive generator inputs the Phase I CP data model and Phase I CP search directive into a CP solver (such as CP solver 214 of FIG. 2). Examples of operations for applying a CP data model and a CP search directive to a CP solver are further discussed below with reference to FIG. 11.

One or more embodiments include generating a Phase II CP data model (Operation 418). The model and directive generator generates a Phase II CP data model. Examples of operations for generating a Phase II CP data model are further discussed below with reference to FIG. 7.

One or more embodiments include generating a Phase II CP search directive (Operation 420). The model and directive generator generates a Phase II CP search directive. Examples of operations for generating a Phase II CP search directive are further discussed below with reference to FIG. 8.

One or more embodiments include inputting the Phase II CP data model and Phase II CP search directive into a CP solver to obtain proposed non-split consumer-host assignments (Operation 422). The model and directive generator inputs the Phase II CP data model and Phase II CP search directive into a CP solver (such as CP solver 222 of FIG. 2). Examples of operations for applying a CP data model and a CP search directive to a CP solver are further discussed below with reference to FIG. 11.

One or more embodiments include generating a Phase III CP data model (Operation 424). The model and directive generator generates a Phase III CP data model. Examples of operations for generating a Phase III CP data model are further discussed below with reference to FIG. 9.

One or more embodiments include generating a Phase III CP search directive (Operation 426). The model and directive generator generates a Phase III CP search directive. Examples of operations for generating a Phase III CP search directive are further discussed below with reference to FIG. 10.

One or more embodiments include inputting the Phase III CP data model and Phase III CP search directive into a CP solver to obtain proposed resource guarantee-host assignments (Operation 428). The model and directive generator inputs the Phase III CP data model and Phase III CP search directive into a CP solver (such as CP solver 228 of FIG. 2). Examples of operations for applying a CP data model and a CP search directive to a CP solver are further discussed below with reference to FIG. 11.

One or more embodiments include applying the proposed resource guarantee-host assignments to the resource system (Operation 430). The CP solver outputs and provides the proposed resource guarantee-host assignments to the resource manager. The resource manager uses the proposed resource guarantee-host assignments to manage the resource system. Examples of operations for assigning designated resources of hosts to consumers based on proposed resource guarantee-host assignments is described below with reference to FIG. 12.

Figure 5:
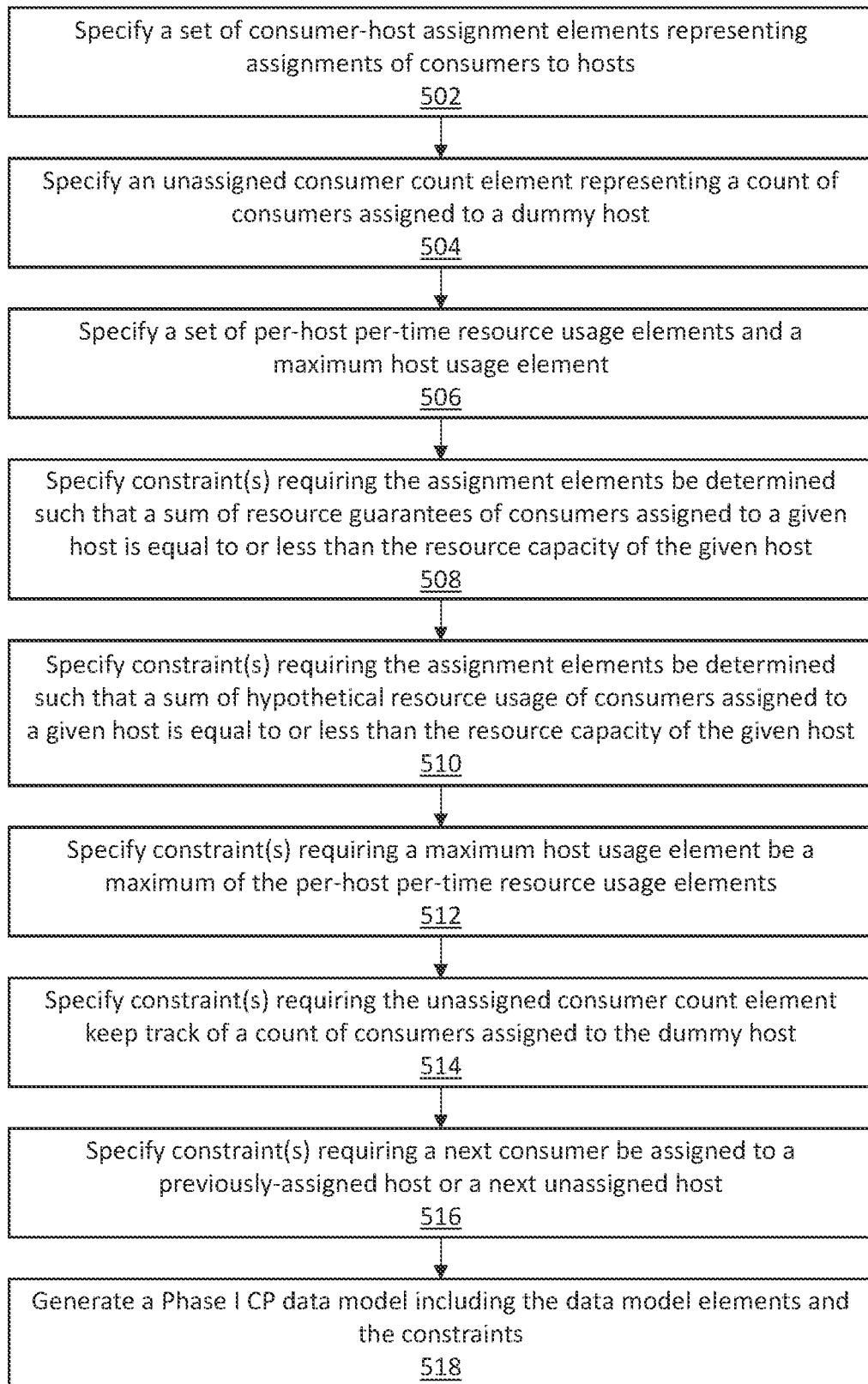
FIG. 5 illustrates an example set of operations for generating a Phase I constraint programming data model, in accordance with one or more embodiments.

6. Generating a Phase I Constraint Programming Data Model and Constraint Programming Search Directive One or more operations illustrated in FIGS. 5-6 may be modified, rearranged, and/or omitted all together. Accordingly, the particular sequence of operations illustrated in FIGS. 5-6 should not be construed as limiting the scope of one or more embodiments. Each data model element and/or domain described herein may be stored as a vector, an array, and/or other data structure(s). Additionally or alternatively, a set of data model elements may be stored together as a single data structure or individually as separate data structures FIG. 5 illustrates an example set of operations for generating a Phase I constraint programming data model, in accordance with one or more embodiments;

One or more embodiments include specifying a set of consumer-host assignment elements, representing assignments of consumers to hosts (Operation 502). A model and directive generator (such as model and directive generator 214 of FIG. 2) specifies a set of consumer-host assignment elements. Additionally, the model and directive generator specifies domains of the consumer-host assignment elements. Examples of consumer-host assignment elements and domains are described above with reference to consumer-host assignments 336 of FIG. 3A.

One or more embodiments include specifying an unassigned consumer count element representing a count of consumers assigned to a dummy host (Operation 504). The model and directive generator specifies an unassigned consumer count element. Additionally, the model and directive generator specifies a domain of the unassigned consumer count element. The model and directive generator obtains an unassigned consumer count cap from a configuration for Phase I. The domain of the unassigned consumer count element is determined based on the unassigned consumer count cap. Examples of an unassigned consumer count element and domain are described above with reference to unassigned consumer count element 338 of FIG. 3A.

One or more embodiments include specifying a set of per-host per-time resource usage elements and a maximum host usage element (Operation 506). The model and directive generator specifies a set of per-host per-time resource usage elements. Additionally, the model and directive generator specifies domains of the per-host per-time resource usage elements. Examples of per-host per-time resource usage elements and domains are described above with reference to per-host per-time resource usage elements 340 of FIG. 3A.

The model and directive generator specifies a maximum host usage element. Additionally, the model and directive generator specifies a domain of the maximum host usage element. Examples of a maximum host usage element and domain are described above with reference to maximum host usage element 342 of FIG. 3A.

One or more embodiments include specifying one or more constraints requiring the consumer-host assignment elements be determined such that a sum of resource guarantees of consumers assigned to a given host is equal to or less than the resource capacity of the given host (Operation 508). The model and directive generator generates a guarantee-capacity constraint, examples of which are described above with reference to guarantee-capacity constraint 344 of FIG. 3A.

One or more embodiments include specifying one or more constraints requiring the consumer-host assignment elements be determined such that a sum of hypothetical resource usages of consumers assigned to a given host is equal to or less than the resource capacity of the given host (Operation 510). The model and directive generator generates a set of resource usage constraints, examples of which are described above with reference to resource usage constraints 346 of FIG. 3A.

One or more embodiments include specifying one or more constraints requiring a maximum host usage element be a maximum of the per-host per-time resource usage elements (Operation 512). The model and directive generator generates a data structure storing the per-host per-time resource usage elements for all hosts in the resource system and all times within the time period of interest. The model and directive generator generates a maximum host usage constraint. An input to the maximum host usage constraint is the generated data structure. Examples of a maximum host usage constraint are described above with reference to maximum host usage constraint 348 of FIG. 3A.

One or more embodiments include specifying one or more constraints requiring the unassigned consumer count element keep track of a count of consumers assigned to the dummy host (Operation 514). The model and directive generator specifies an unassigned count-cap constraint, examples of which are described above with reference to unassigned count-cap constraint 350 of FIG. 3A.

One or more embodiments include specifying one or more constraints requiring a next consumer be assigned to a previously-assigned host or a next unassigned host (Operation 516). The model and directive generator generates a symmetry breaking constraint, examples of which are described above with reference to symmetry breaking constraint 352 of FIG. 3A.

One or more embodiments include generating a Phase I CP data model including the data model elements and the constraints (Operation 518). The model and directive generator generates a CP data model. The CP data model includes the consumer-host assignment elements, the unassigned consumer count element, the per-host per-time resource usage elements, and the maximum host usage element. The CP data model further includes the guarantee-capacity constraint, the resource usage constraints, the maximum host usage constraint, the unassigned count-cap constraint, and the symmetry breaking constraint.

The CP data model may be stored as a software data structure. The CP data model may include one or more arrays, vectors, linked lists, tables, software variables, constants, and/or data objects. The CP data model may include a set of data and/or instructions readable by one or more devices including a hardware processor.

Figure 6:
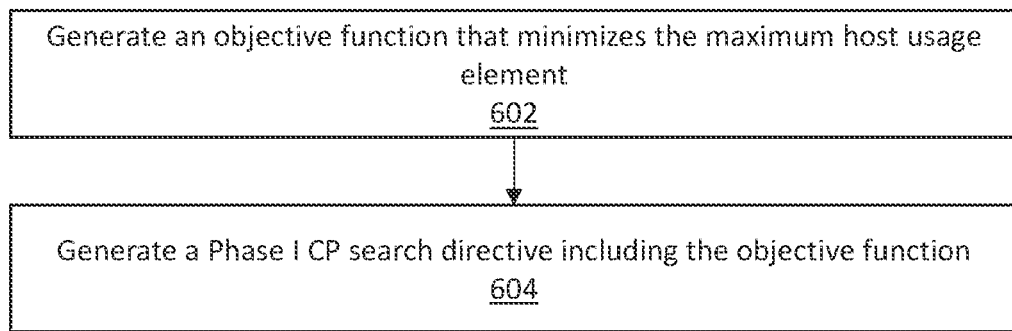
FIG. 6 illustrates an example set of operations for generating a Phase I constraint programming search directive, in accordance with one or more embodiments.

FIG. 6 illustrates an example set of operations for generating a Phase I constraint programming search directive, in accordance with one or more embodiments.

One or more embodiments include generating an objective function that minimizes the maximum host usage element (Operation 602). A model and directive generator (such as model and directive generator 214 of FIG. 2) generates an objective function that minimizes the maximum host usage element. The objective function may be expressed as:

min(MaxHostUsage), or min (max(PerHostPerTimeResourceUsage$_{j,t}$ for all $j$ and all $t$))

where:
j refers to a respective host, and t refers to a respective time;
MaxHostUsage represents the maximum host usage element;
PerHostPerTimeResourceUsage$_{j,t}$ for all j and all t represents the set of per-host per-time resource usage elements.

One or more embodiments include generating a Phase I CP search directive including the objective function (Operation 604). The model and directive generator generates a CP search directive. The CP search directive includes the objective function. The CP search directive may be stored as a software data structure. The CP search directive may include one or more arrays, vectors, linked lists, tables, software variables, constants, and/or data objects. The CP search directive may include a set of instructions executable by one or more devices including a hardware processor.

7. Generating a Phase II Constraint Programming Data Model and Constraint Programming Search Directive One or more operations illustrated in FIGS. 7-8 may be modified, rearranged, and/or omitted all together. Accordingly, the particular sequence of operations illustrated in FIGS. 7-8 should not be construed as limiting the scope of one or more embodiments. Each data model element and/or domain described herein may be stored as a vector, an array, and/or other data structure(s). Additionally or alternatively, a set of data model elements may be stored together as a single data structure or individually as separate data structures.

Figure 7:
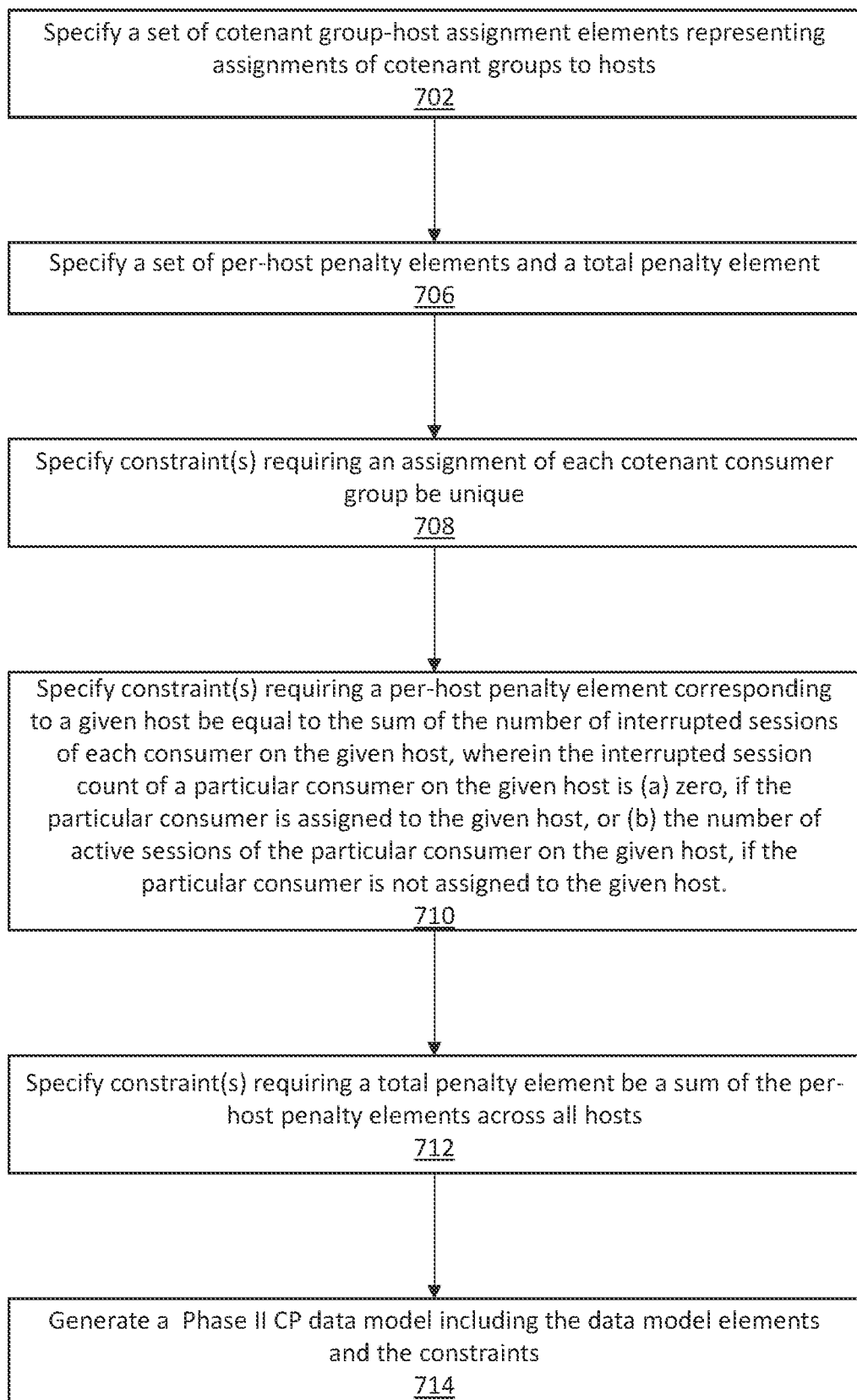
FIG. 7 illustrates an example set of operations for generating a Phase II constraint programming data model, in accordance with one or more embodiments.

FIG. 7 illustrates an example set of operations for generating a Phase II constraint programming data model, in accordance with one or more embodiments.

One or more embodiments include specifying a set of cotenant group-host assignment elements representing assignments of cotenant groups to hosts (Operation 702). A model and directive generator (such as model and directive generator 222 of FIG. 2) specifies a set of cotenant group-host assignment elements. Each cotenant group-host assignment element corresponds to a respective cotenant group (determined from Phase I). Additionally, the model and directive generator specifies domains of the cotenant group-host assignment elements. Examples of cotenant group-host assignment elements and domains are described above with reference to cotenant group-host assignment elements 354 of FIG. 3B.

As an example, a resource system may include database instances DB1, DB2, DB3, DB4, DB5, and hosts Host1, Host2. Phase I may determine the following cotenant groups and unassigned group:
Cotenant Group 1: DB1, DB4;
Cotenant Group 2: DB2;
Unassigned Group: DB3, DB5.

In Phase II, a model and directive generator may generate the following cotenant group-host assignment elements:
Cotenant group-host assignment element 1 (corresponding to Cotenant Group 1);
Cotenant group-host assignment element 2 (corresponding to Cotenant Group 2).

If a value of 2 is assigned to Cotenant group-host assignment element 1, then Host2 is assigned to each consumer within Cotenant Group 1, that is, DB1 and DB4. A value of 1 assigned to Cotenant group-host assignment element 2 indicates that Host1 is assigned to each consumer within Cotenant Group 1, that is, DB2. Consumers within the Unassigned Group, that is, DB3, DB5, are ignored in Phase II.

One or more embodiments include specifying a set of per-host penalty elements and a total penalty element (Operation 706). The model and directive generator specifies a set of per-host penalty elements. Additionally, the model and directive generator specifies domains of the per-host penalty elements. Examples of per-host penalty elements and domains are described above with reference to per-host penalty elements 358 of FIG. 3B.

The model and directive generator specifies a total penalty element. Additionally, the model and directive generator specifies a domain of the total penalty element. Examples of a total penalty element and domain are described above with reference to total penalty element 360 of FIG. 3B.

One or more embodiments include specifying one or more constraints requiring an assignment of each cotenant consumer group be unique (Operation 708). The model and directive generator generates a cotenant group all different constraint, examples of which are described above with reference to cotenant group all difference constraint 362 of FIG. 3B.

One or more embodiments include specifying one or more constraints requiring a per-host penalty element corresponding to a given host be equal to the sum of the number of interrupted sessions of each consumer on the given host, wherein the interrupted session count of a particular consumer on the given host is (a) zero, if the particular consumer is assigned to the given host, or (b) the number of active sessions of the particular consumer on the given host, if the particular consumer is not assigned to the given host (Operation 710). The model and directive generator specifies that the number of active sessions of a particular consumer on a particular host is determined from session data obtained from the resource manager.

The model and directive generator generates a set of per-host penalty constraints. Each per-host penalty constraint corresponds to a respective host. Data structures representing numbers of active sessions of each consumer on a particular host are inputs to a per-host penalty constraint corresponding to the particular host. Examples of per-host penalty constraints are described above with reference to per-host penalty constraints 364 of FIG. 3B.

One or more embodiments include specifying one or more constraints requiring a total penalty element be a sum of the per-host penalty elements across all hosts (Operation 712). The model and directive generator generates a penalty sum constraint. The per-host penalty elements corresponding to all hosts in the resource system are inputs to the penalty sum constraint. Examples of a penalty sum constraint are described above with reference to penalty sum constraint 366 of FIG. 3B.

One or more embodiments include generating a Phase II CP data model including the data model elements and the constraints (Operation 714). Examples of operations for generating a CP data model are described above with reference to Operation 518 of FIG. 5.

Figure 8:
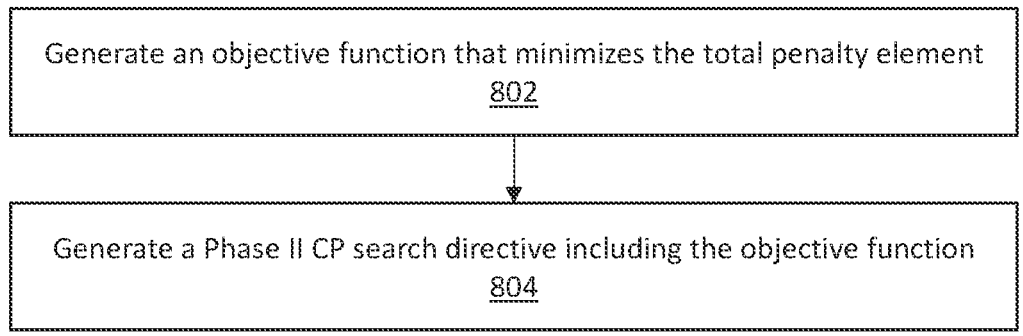
FIG. 8 illustrates an example set of operations for generating a Phase II constraint programming search directive, in accordance with one or more embodiments.

FIG. 8 illustrates an example set of operations for generating a Phase II constraint programming search directive, in accordance with one or more embodiments.

One or more embodiments include generating an objective function that minimizes the total penalty element (Operation 802). The model and directive generator generates an objective function that minimizes the total penalty element. The objective function may be expressed as:

$$\min(TotalPenaltyElement), \text{ or } \min\left(\sum_j PerHostPenaltyElement_j\right)$$

where:
j refers to a respective host;
TotalPenaltyElement refers to a total penalty element;
PerHostPenaltyElement$_j$ refers to a per-host penalty element corresponding to host$_j$.

One or more embodiments include generating a CP search directive including the objective function (Operation 804). Examples of operations for generating a CP search directive are described above with reference to Operation 604.

8. Generating a Phase III Constraint Programming Data Model and Constraint Programming Search Directive One or more operations illustrated in FIGS. 9A-10 may be modified, rearranged, and/or omitted all together. Accordingly, the particular sequence of operations illustrated in FIGS. 9A-10 should not be construed as limiting the scope of one or more embodiments. Each data model element and/or domain described herein may be stored as a vector, an array, and/or other data structure(s). Additionally or alternatively, a set of data model elements may be stored together as a single data structure or individually as separate data structures.

Figure 9A:
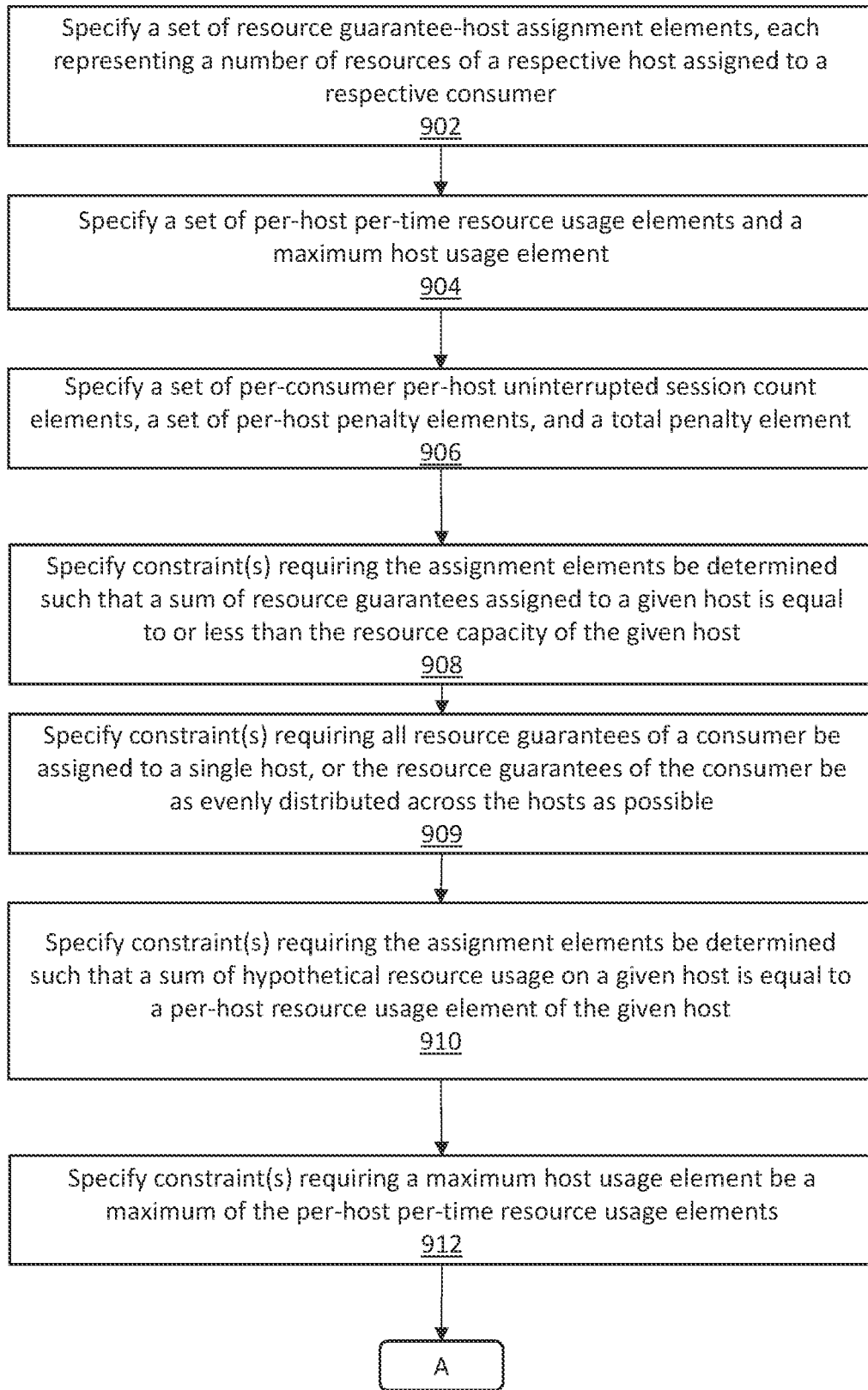
FIGS. 9A-B illustrates an example set of operations for generating a Phase III constraint programming data model, in accordance with one or more embodiments.
Figure 9B:
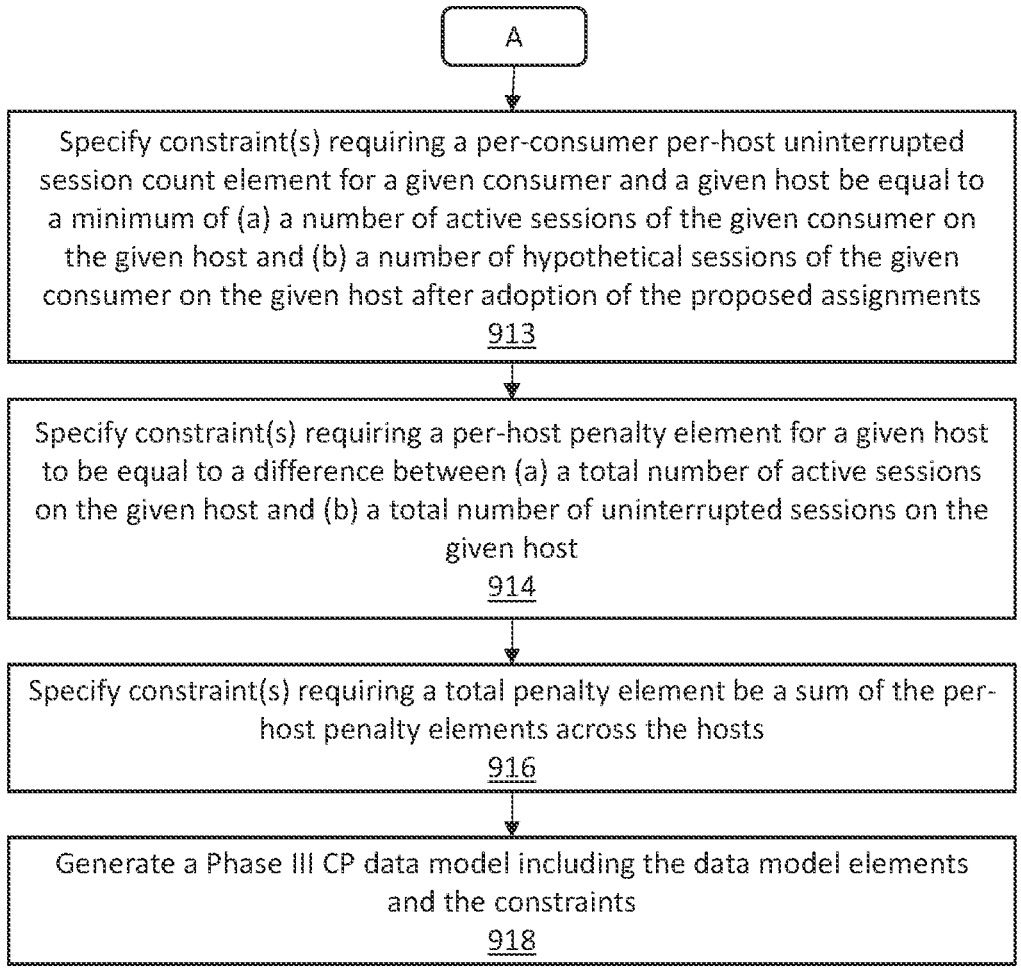

FIGS. 9A-B illustrates an example set of operations for generating a Phase III constraint programming data model, in accordance with one or more embodiments.

One or more embodiments include specifying a set of resource guarantee-host assignment elements, representing assignments of resource guarantees to hosts (Operation 902). A model and directive generator (such as model and directive generator 228 of FIG. 2) specifies a set of resource guarantee-host assignment elements. Additionally, the model and directive generator specifies domains of the resource guarantee-host assignment elements. Examples of resource guarantee-host assignment elements and domains are described above with reference to resource guarantee-host assignment elements 368 of FIG. 3C.

As an example, a resource system may include database instances DB1, DB2, DB3, DB4, DB5, and hosts Host1, Host2. The resource guarantees of the database instances may be as follows:
DB1: 5 CPUs;
DB2: 4 CPUs;
DB3: 3 CPUs;
DB4: 2 CPUs;
DB5: 6 CPUs.

Phase I may determine the following cotenant groups and unassigned group:
Cotenant Group 1: DB1, DB4;
Cotenant Group 2: DB2;
Unassigned Group: DB3, DB5.

Phase II may determine the following cotenant group assignments:
Cotenant Group 1: Host2;
Cotenant Group 2: Host1.

In Phase III, a model and directive generator may generate the following resource guarantee-host assignment elements and domains:

TABLE 9

|     | Host1              | Host2              |
| --- | ------------------ | ------------------ |
| DB1 | [0]                | [5]                |
| DB2 | [4]                | [0]                |
| DB3 | [0, 1, 2, 3]       | [0, 1, 2, 3]       |
| DB4 | [0]                | [2]                |
| DB5 | [0, 1, 2, 3, 4, 5, 6] | [0, 1, 2, 3, 4, 5, 6] |

DB1 is a non-split consumer from Phase I. A host assigned to DB1 from Phase II is Host2. A resource guarantee-host assignment element corresponding to DB1 and the assigned host Host2 has a domain equal to the total number of resource guarantees for DB1, that is, 5. A resource guarantee-host assignment element corresponding to DB1 and each unassigned host such as Host1 has a domain equal to zero.

DB2 is a non-split consumer from Phase I. A host assigned to DB2 from Phase II is Host1. A resource guarantee-host assignment element corresponding to DB2 and the assigned host Host1 has a domain equal to the total number of resource guarantees for DB2, that is, 4. A resource guarantee-host assignment element corresponding to DB2 and each unassigned host such as Host2 has a domain equal to zero.

DB4 is a non-split consumer from Phase I. A host assigned to DB4 from Phase II is Host2. A resource guarantee-host assignment element corresponding to DB4 and the assigned host Host2 has a domain equal to the total number of resource guarantees for DB4, that is, 2. A resource guarantee-host assignment element corresponding to DB4 and each unassigned host such as Host1 has a domain equal to zero.

DB3 is a split consumer from Phase I. A resource guarantee-host assignment element corresponding to DB3 and any host has a domain ranging from zero to the total number of resource guarantees for DB3, which is 3. Hence, the domain is [0, 1, 2, 3].

DB5 is a split consumer from Phase I. A resource guarantee-host assignment element corresponding to DB5 and any host has a domain ranging from zero to the total number of resource guarantees for DB5, which is 6. Hence, the domain is [0, 1, 2, 3, 4, 5, 6].

One or more embodiments include specifying a set of per-host per-time resource usage elements and a maximum host usage element (Operation 904). The model and directive generator specifies a set of per-host per-time resource usage elements. Additionally, the model and directive generator specifies domains of the per-host per-time resource usage elements. Examples of per-host per-time resource usage elements and domains are described above with reference to per-host per-time resource usage elements 370 of FIG. 3C.

The model and directive generator specifies a maximum host usage element. Additionally, the model and directive generator specifies a domain of the maximum host usage element. Examples of a maximum host usage element and domain are described above with reference to maximum host usage element 372 of FIG. 3C.

One or more embodiments include specifying a set of per-consumer per-host uninterrupted session count elements, a set of per-host penalty elements, and a total penalty element (Operation 906). The model and directive generator specifies a set of per-consumer per-host uninterrupted session count elements, a set of per-host penalty elements, and a total penalty element. Additionally, the model and directive generator specifies domains of each of the set of per-consumer per-host uninterrupted session count elements, the set of per-host penalty elements, and the total penalty element. Examples of per-consumer per-host uninterrupted session count elements and domains are described above with reference to per-consumer per-host uninterrupted session count elements 373 of FIG. 3C. Examples of per-host penalty elements and domains are described above with reference to per-host penalty elements 374 of FIG. 3C. Examples of a total penalty element and domain are described above with reference to total penalty element 376 of FIG. 3C.

One or more embodiments include specifying one or more constraints requiring the resource guarantee-host assignment elements be determined such that a sum of resource guarantees assigned to a given host is equal to or less than the resource capacity of the given host (Operation 908). The model and directive generator generates a set of guarantee-capacity constraints, examples of which are described above with reference to guarantee-capacity constraints 378 of FIG. 3C.

One or more embodiments include specifying one or more constraints requiring all resource guarantees of a consumer be assigned to a single host, or the resource guarantees of the consumer be as evenly distributed across the hosts as possible (Operation 909). The model and directive generator generates a set of resource balancing constraints, examples of which are described above with reference to resource balancing constraints 379 of FIG. 3C.

One or more embodiments include specifying one or more constraints requiring the resource guarantee-host assignment elements be determined such that a sum of hypothetical resource usages on a given host is equal to or less than the resource capacity of the given host (Operation 910). The model and directive generator generates a set of data structures representing the hypothetical resource usage per consumer per host per time according to proposed assignments as indicated by the resource guarantee-host assignment elements. A hypothetical resource usage by a particular consumer on a particular host at a particular time is determined based on (a) a total resource usage of the particular consumer at the particular time, (b) a total number of resource guarantees of the particular consumer, and (c) a number of resource guarantees of the particular consumer that are assigned to the particular host. The model and directive generator specifies that a total resource usage of the particular consumer at the particular time, and a total number of resource guarantees of the particular consumer are determined based on resource usage data and/or other data obtained from the resource manager. The model and directive generator specifies that a number of resource guarantees of the particular consumer that are assigned to the particular host is indicated by the resource guarantee-host assignment element corresponding to the particular consumer and the particular host.

The model and directive generator generates a set of resource usage constraints. Each resource usage constraint corresponds to a respective host and a respective time. The data structures representing the resource usage by each consumer on a particular host at a particular time are inputs to a resource usage constraint corresponding to the particular host and the particular time. Examples of resource usage constraints are described above with reference to resource usage constraints 380 of FIG. 3C.

One or more embodiments include specifying one or more constraints requiring a maximum host usage element be a maximum of the per-host per-time resource usage elements (Operation 912). Examples of operations for specifying constraints requiring a maximum host usage element be a maximum of the per-host per-time resource usage elements are described above with reference to Operation 512. Examples of a maximum host usage constraint are described above with reference to maximum host usage constraint 382 of FIG. 3C.

One or more embodiments include specifying constraint(s) requiring a per-consumer per-host uninterrupted session count element for a given consumer and a given host be equal to a minimum of (a) a number of active sessions of the given consumer on the given host and (b) a number of hypothetical sessions of the given consumer on the given host after adoption of the proposed assignments (Operation 913). The model and directive generator specifies that the number of active sessions of each consumer on each host is determined from session data obtained from the resource manager. The model and directive generator specifies that the number of hypothetical sessions of each consumer on each host after adoption of the proposed assignments is determined based on a session factor.

The model and directive generator generates a set of per-consumer per-host uninterrupted session constraints, examples of which are described above with reference to per-consumer per-host uninterrupted session constraints 383 of FIG. 3C.

One or more embodiments include specifying one or more constraints requiring a per-host penalty element for a given host be equal to the number of sessions that are interrupted to the given host when adopting the proposed assignments from the most recent assignments (Operation 914). The model and directive generator generates a set of per-host penalty constraints, examples of which are described above with reference to per-host penalty constraints 384 of FIG. 3C.

One or more embodiments include specifying one or more constraints requiring a total penalty element be a sum of the per-host penalty elements across the hosts (Operation 916). The model and directive generator generates a penalty sum constraint, examples of which are described above with reference to penalty sum constraint 386 of FIG. 3C.

One or more embodiments include generating a Phase III CP data model including the data model elements and the constraints (Operation 918). Examples of operations for generating a CP data model are described above with reference to Operation 518 of FIG. 5.

Figure 10:
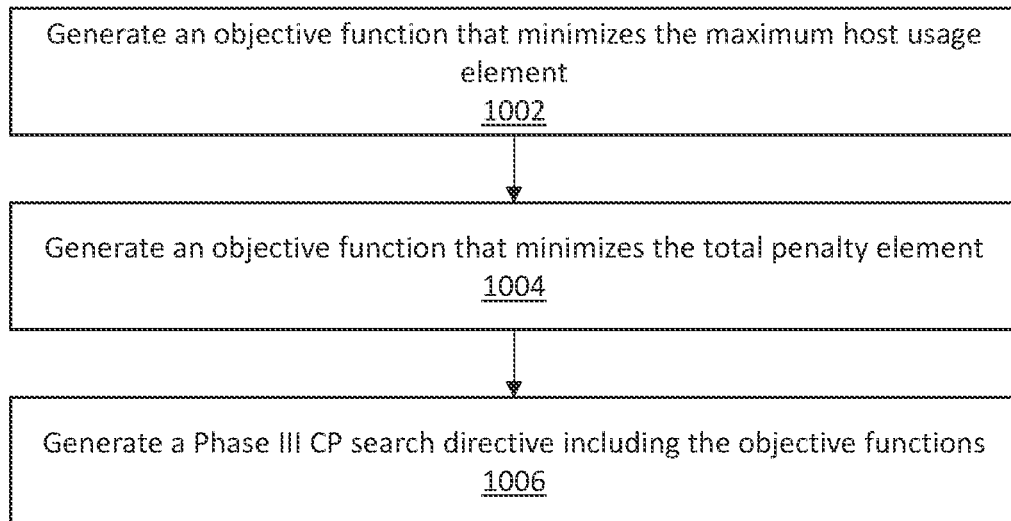
FIG. 10 illustrates an example set of operations for generating a Phase III constraint programming search directive, in accordance with one or more embodiments.

FIG. 10 illustrates an example set of operations for generating a Phase III constraint programming search directive, in accordance with one or more embodiments.

One or more embodiments include generating an objective function that minimizes the maximum host usage element (Operation 1002). Examples of operations for generating an objective function that minimizes the maximum host usage element are described above with reference to Operation 602 of FIG. 6.

One or more embodiments include generating an objective function that minimizes the total penalty element (Operation 1004). Examples of operations for generating an objective function that minimizes the total penalty element are described above with reference to Operation 802 of FIG. 8.

One or more embodiments include generating a Phase III CP search directive including the objective functions (Operation 1006). Examples of operations for generating a CP search directive are described above with reference to Operation 604. The model and search directive generator specifies that the minimization of the maximum host usage element takes priority over the minimization of the total penalty element.

9. Applying a Constraint Programming Data Model and a Constraint Programming Search Directive to a Constraint Programming Solver One or more operations illustrated in FIG. 11 may be modified, rearranged, and/or omitted all together. Accordingly, the particular sequence of operations illustrated in FIG. 11 should not be construed as limiting the scope of one or more embodiments.

Figure 11:
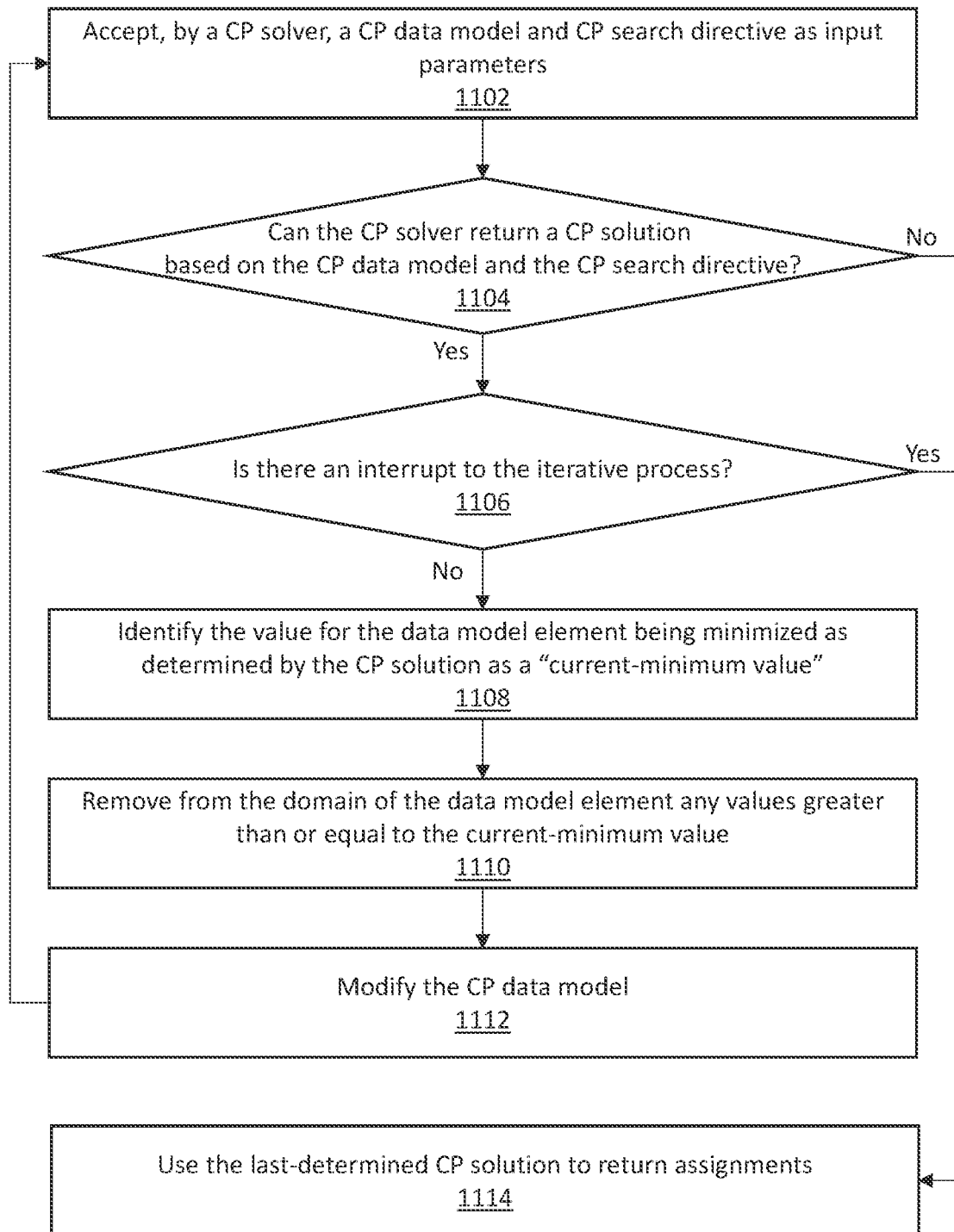
FIG. 11 illustrates an example set of operations for applying a constraint programming data model and a constraint programming search directive to a constraint programming solver, in accordance with one or more embodiments.

FIG. 11 illustrates an example set of operations for applying a constraint programming data model and a constraint programming search directive to a constraint programming solver, in accordance with one or more embodiments.

One or more embodiments include accepting, by a CP solver, a CP data model and CP search directive as input parameters (Operation 1102). A CP solver (such as CP solver 214, 222, 228 of FIG. 2) accepts a CP data model and CP search directive as input parameters. Examples of operations for generating a CP data model are described above with reference to FIGS. 5, 7, 9A-B. Examples of operations for generating a CP search directive are described above with reference to FIGS. 6, 8, 10.

One or more embodiments include determining whether the CP solver can return a CP solution based on the CP data model and the CP search directive (Operation 1104). The CP solver applies one or more constraint programming techniques to the CP data model, guided by the CP search directive. The CP solver determines a CP solution based on the CP data model and the CP search directive, or determines that no CP solution that satisfies all constraints of the CP data model exists.

Constraint programming techniques include, for example, constraint propagation, backtracking search algorithms, and/or forward-checking algorithms. Constraint propagation involves eliminating inconsistent values from domains of data model elements in a CP data model. Backtracking search algorithms involve incrementally building candidates for a CP solution, including abandoning a candidate as soon as the CP solver determines that the candidate cannot possibly be completed to provide a valid CP solution. Forward-checking algorithms involve attempting to foresee the effect of choosing one candidate over other candidates for a CP solution, or determining a sequence in which to attempt candidates for a CP solution. In an embodiment, the CP solver updates domains of data model elements as the CP solver traverses and assigns values to the data model elements. The CP solver removes values from domains that are no longer possible, given the preliminary assignments made thus far. The CP solver removes values from the domains that would violate any constraints in the CP data model.

As an example, a CP solver may traverse each of a set of consumer-host assignment elements specified by a CP data model to determine a CP solution. The CP solver may attempt to make an assignment for a particular consumer-host assignment element. A value from the domain of the particular consumer-host assignment element is preliminarily assigned to the particular consumer-host assignment element. The CP solver then eliminates, from domains of other data model elements of the CP data model, values that are inconsistent with the preliminarily-assigned value for the particular consumer-host assignment element. If this preliminary assignment violates a constraint specified by the CP data model (for example, a domain of another data model element is completely eliminated), then another value from the domain of the particular consumer-host assignment element is preliminarily assigned to the particular consumer-host assignment element. If all values from the domain of the particular consumer-host assignment element are attempted and do not satisfy the constraint, then re-assignment of one or more consumer-host assignment elements previously traversed is performed. In particular, a value from the domain of a previously-traversed consumer-host assignment element was preliminarily assigned to the previously-traversed consumer-host assignment element. Based on the need for re-assignment, another value from the domain of the previously-traversed consumer-host assignment element is now preliminarily assigned to the previously-traversed consumer-host assignment element. Then, assignment of the particular consumer-host assignment element is re-attempted.

Continuing the example, the CP solver may be guided by an objective function specified by a CP search directive. The CP solver may determine a sequence in which values are attempted for assignment to one or more consumer-host assignment elements based on the CP search directive. If assignment of Value A to a particular consumer-host assignment element is attempted before Value B, and a valid CP solution is found, then the assignment of Value A is finalized, regardless of whether assignment of Value B would have arrived at a valid CP solution. Hence, assignment of Value A is prioritized over Value B.

In the above manner, the CP solver may traverse each consumer-host assignment element, until each consumer-host assignment element is assigned a value from the respective domain, without violating the constraints. The CP solver may determine the preliminary assignments as final assignments. A CP solution may include the final assignments of values to consumer-host assignment elements.

Alternatively, the CP solver may traverse each consumer-host assignment element, until assignment of each value to the consumer-host assignment elements is attempted, and yet none of the assignments satisfy the constraints. Then, the CP solver may determine that there is no valid CP solution for the CP data model. The CP solver may return a message indicating that no CP solution exists.

If no CP solution is returned, then one or more embodiments include using the last-determined CP solution to return proposed assignments (Operation 1114). Since no CP solution is returned in the current iteration, the CP solver retrieves the CP solution returned in the last iteration. The CP solver identifies the CP solution from the last iteration as the last-determined CP solution. The CP solver also identifies the CP solution from the last iteration as the CP solution satisfying an objective function of the CP search directive. For example, where the objective function minimizes total penalty, the CP solution from the last iteration is the CP solution associated with the lowest total penalty (compared to other CP solutions satisfying the constraints of the CP data model). The CP solution specifies values assigned to the assignment elements.

In Phase I, a CP solution having a particular value assigned to a consumer-host assignment element corresponding to a particular consumer indicates that a host identified by the particular value is assigned to the particular consumer.

In Phase II, a CP solution having a particular value assigned to a cotenant group-host assignment element corresponding to a particular cotenant group indicates that a host identified by the particular value is assigned to the particular cotenant group, and thereby assigned to each consumer within the particular cotenant group.

In Phase III, a CP solution having a particular value assigned to a resource guarantee-host assignment element corresponding to a particular consumer and a particular host indicates that a number of resource guarantees of the particular consumer that are assigned to the particular host is equal to the particular value.

If there is no last-determined CP solution (that is, the CP solver is not able to return a CP solution in the first iteration of Operation 1102), then the CP solution generates a message indicating that no valid CP solution exists for the provided CP data model.

Conversely, if a CP solution is returned at Operation 1104, then one or more embodiments include determining whether an interrupt to the iterative process has been received (Operation 1106). As illustrated, Operations 1102-1112 form an iterative process for finding a CP solution associated with a best solution satisfying an objective function. In Phase I, for example, a best solution is a solution having a smallest maximum value from the per-host per-time resource usages; that is, a maximum value from the per-host per-time resource usages for the best solution is smaller than a maximum value from the per-host per-time resource usages for any other valid CP solution. A user and/or an application may interrupt the iterative process. As an example, a user may indicate via a user interface that the user desires a best CP solution determined thus far, without waiting for the iterative process to complete. Hence, the best CP solution determined thus far is not necessarily the best solution compared to all valid CP solutions, however a processing time for returning proposed assignments may be reduced.

If an interrupt is received at Operation 1106, then one or more embodiments include using the last-determined CP solution to return proposed assignments (Operation 1114). Since a CP solution is returned in the current iteration, the CP solver identifies the CP solution from the current iteration as the last-determined CP solution. Examples of operations for determining assignments based on a CP solution are provided in the above description of Operation 1114.

In an embodiment, an interrupt may be received while the CP solver is in the process of determining a CP solution (at Operations 1102-1104). The interrupt is received before a CP solution is returned in the current iteration. Hence, the CP solver identifies the CP solution from the last iteration as the last-determined CP solution.

The last-determined CP solution, based on an interrupt, is not necessarily the CP solution associated with the best solution satisfying the objective function. A request to resume the iterative process for determining the best solution may be received. In response to the resumption request, the iterative process may continue at Operation 1108.

If an interrupt is not received, then one or more embodiments include identifying the value for the data model element being minimized as determined by the CP solution as a "current-minimum value" (Operation 1108). In Phase I, the maximum of the values assigned to the per-host per-time resource usage elements is minimized. The CP solver identifies the maximum of the values assigned to the per-host per-time resource usage elements associated with the CP solution obtained at Operation 1104 in the current iteration. The maximum is identified as a "current-minimum maximum."

In Phase II, the total penalty is minimized. The CP solver identifies the value assigned to the total penalty element associated with the CP solution obtained at Operation 1104 in the current iteration. The total penalty value is identified as a "current-minimum total."

In Phase III, the maximum of the values assigned to the per-host per-time resource usage elements is being minimized, then the total penalty is minimized. Examples of operations for determining a "current-minimum maximum" and "current-minimum total" are described in relation to Phase I and II, respectively.

One or more embodiments include removing, from the domain of the data model element, any values greater than or equal to the current-minimum value (Operation 1110). In Phase I, the CP solver uses the current-minimum maximum as an upper bound on the possible values to be assigned to the per-host per-time resource usage elements during a next iteration. The CP solver removes, from the domain of each per-host per-time resource usage element, any values greater than or equal to the current-minimum maximum.

In Phase II, the CP solver uses the current-minimum total as an upper bound on the possible values to be assigned to the total penalty element during a next iteration. The CP solver removes, from the domain of the total penalty element, any values greater than or equal to the current-minimum total.

As an example, during a current iteration, the CP solver may return a current CP solution. The current CP solution may indicate that the total penalty element is assigned with a total penalty value of "9." The CP solver may determine "9" as the current-minimum total. The CP solver may determine that a current domain of the total penalty element is {0, 4, 5, 8, 9, 11, 12}. The CP solver may remove, from the domain of the total penalty element, any total penalty values greater than or equal to 9. Hence, the CP solver may modify the domain of the total penalty element to become 10, 4, 5, 81.

One or more embodiments include modifying the CP data model (Operation 1112). The CP solver modifies the CP data model to include the data model element with the reduced domain. Based on Operation 1110 in Phase I, the domain of each per-host per-time resource usage element includes only values below the current-minimum maximum. Based on Operation 1110 in Phase II, the domain of the total penalty element includes only values below the current-minimum total.

The CP solver iterates Operations 1102-1112 with respect to the modified CP data model. At Operation 1102, the CP solver accepts the CP data model that has been modified as an input parameter. At Operations 1104-1108, assuming that the CP solver determines a new CP solution based on the modified CP data model, the CP solver updates the current-minimum maximum in Phase I, or the current-minimum total in Phase II. The CP solver identifies a value assigned to the data model element being optimized in the new CP solution as the current-minimum maximum or the current-minimum total. At Operation 1110, the CP solver removes, from the domain of the data model element, any values greater than or equal to the current-minimum maximum or the current-minimum total. At Operation 1112, the CP solver once again modifies the CP data model. The CP solver continues the iterative process until the CP solver cannot find a CP solution at Operation 1104, or an interrupt is received at Operation 1106. As described above with reference to Operation 1114, when the CP solver cannot find a CP solution at Operation 1104, or an interrupt is received at Operation 1106, the CP solver uses the last-determined CP solution to return proposed assignments. If the CP solver completes the iterations without interruption, then the last-determined CP solution is the optimal solution, that is, there are no other solutions with a more minimal value for the data model element being optimized.

In one or more embodiments, additional and/or alternative operations for applying a constraint programming data model and search directive to a constraint programming solver may be performed, based on different search techniques and/or different search directives. Examples of different search techniques and/or different search directives are described below.

In an embodiment, before a first application of the CP data model to the CP solver at Operation 1102, the CP data model is modified. A particular value within the domain of the data model element being optimized is determined as an initial cutoff value. The initial cutoff value may be, for example, a median of the domain. All values above the initial cutoff value are removed from the domain of the data model element at issue. Hence, a first run of the CP solver is required to generate a CP solution with a value for the data model element that is below the initial cutoff value. By setting the initial cutoff value, the CP solver may more efficiently arrive at a CP solution with a lower value for the data model element at issue, if a valid CP solution exists.

In an embodiment, the CP solver iterates until all possible CP solutions, for the given CP data model, are found. The CP solver does not modify the domain of any data model element being optimized based on a prior iteration. Hence, the CP solver may find a CP solution with a higher value for the data model element being optimized than a prior CP solution. After determining all possible CP solutions, the CP solver compares the values determined for the data model element in each CP solution. The CP solver then identifies the CP solution with the lowest value for the data model element.

In an embodiment, multiple CP solutions may be associated with a same lowest value for a data model element being optimized. The iterative process may be modified to determine such CP solutions. At Operation 1110, remove from the domain of the data model element any values greater than the current-minimum value (but keep any value equal to the current-minimum value). At Operation 1104, the CP solver attempts to find a CP solution that has not yet been found. CP solutions with a same value for the data model element (as the last-determined CP solution) are recorded. If no further CP solutions can be found, then at Operation 1114, the set of last-determined CP solutions with the same value for the data model element are identified. One CP solution is selected from the set of last-determined CP solutions with the same value for the data model element. Any selection criteria may be used. As an example, a CP solver may select a CP solution, from the set of last-determined CP solutions with the same value for the data model element, that is associated with resource usages that are most evenly spread across the hosts for the most amount of time.

As an example, in Phase III, a primary objective is to minimize a maximum value from the per-host per-time resource usages, and a secondary objective is to minimize a total penalty across all hosts. A CP solver first focuses on the primary objective. At Operation 1108, the CP solver identifies a maximum value for the per-host per-time resource usage elements as a current-minimum maximum. At Operation 1110, values in the domain of any per-host per-time resource usage elements that are greater than the current-minimum maximum are removed. A next iteration of the process is performed in an attempt to find another CP solution with a lower or same current-minimum maximum. If multiple CP solutions with the same minimum maximum value for the per-host per-time resource usages is found, then the CP solver iterates the process with respect to the secondary objective. When optimizing for the secondary objective, the CP solver considers only the CP solutions with the same minimum maximum value for the per-host per-time resource usages. The CP solver selects a CP solution, from the CP solutions with the same minimum maximum value for the per-host per-time resource usages, that has a lowest total penalty.

10. Designating Resources Based on Resource Guarantee-Host Assignments

Figure 12:
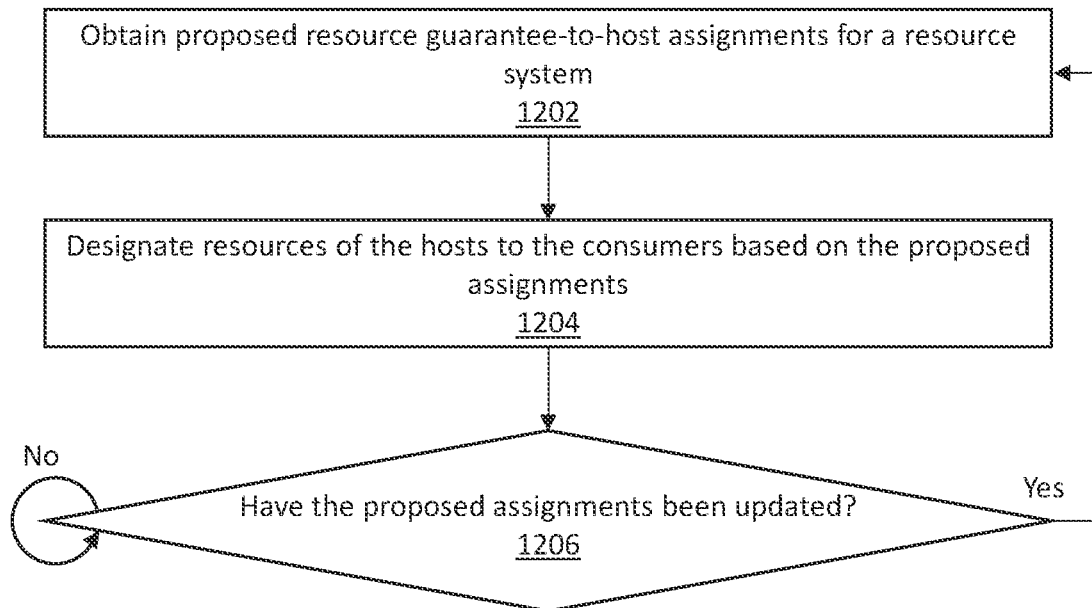
FIG. 12 illustrates an example set of operations for designating resources of hosts to consumers based on resource guarantee-host assignments updated by a constraint programming solver, in accordance with one or more embodiments.

One or more operations illustrated in FIG. 12 may be modified, rearranged, and/or omitted all together. Accordingly, the particular sequence of operations illustrated in FIG. 12 should not be construed as limiting the scope of one or more embodiments.

FIG. 12 illustrates an example set of operations for designating resources of hosts to consumers based on resource guarantee-host assignments updated by a constraint programming solver, in accordance with one or more embodiments.

One or more embodiments include obtaining proposed resource guarantee-host assignments for a resource system (Operation 1202). A resource manager (such as resource manager 110 of FIG. 1) obtains proposed resource guarantee-host assignments based on a CP solution determined by a CP solver (such as CP solver 228 of FIG. 2). Examples of operations for determining a CP solution are described above with reference to FIG. 11, and in particular Operation 1114.

One or more embodiments include designating resources of the hosts to the consumers based on the proposed assignments (Operation 1204). The resource manager designates resources of the hosts to the consumers based on the proposed assignments. In an embodiment, the resource manager makes the designations, without receiving user confirmation for the proposed assignments.

As an example, a computing system may include two database instances, DB1, DB2, and two hosts, Host1, Host2. DB1 may have a total resource guarantee of 4. DB2 may have a total resource guarantee of 9. A CP solution may indicate the following proposed assignments of resource guarantees:

TABLE 10

|  | Host1 | Host2 |
|---|---|---|
| DB1 | 2 | 2 |
| DB2 | 5 | 4 |

Thus, a resource manager may designate 2 CPUs of Host1 to DB1; 5 CPUs of Host1 to DB2; 2 CPUs of Host2 to DB1; and 4 CPUs of Host2 to DB2. A designated resource is reserved for use by the corresponding consumer and cannot be used by other consumers in the computing system. Therefore a consumer using designated resources is not vulnerable to interruptions caused by the demands of other consumers in the computing system. Meanwhile, resources that remain undesignated are available for sharing amongst the database instances.

One or more embodiments include determining whether the proposed assignments have been updated (Operation 1206). The resource manager determines whether the proposed resource guarantee-host assignments have been updated. If there has been an update (from a CP solver), then the resource manager redetermines resource designations at Operation 1204.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 13:
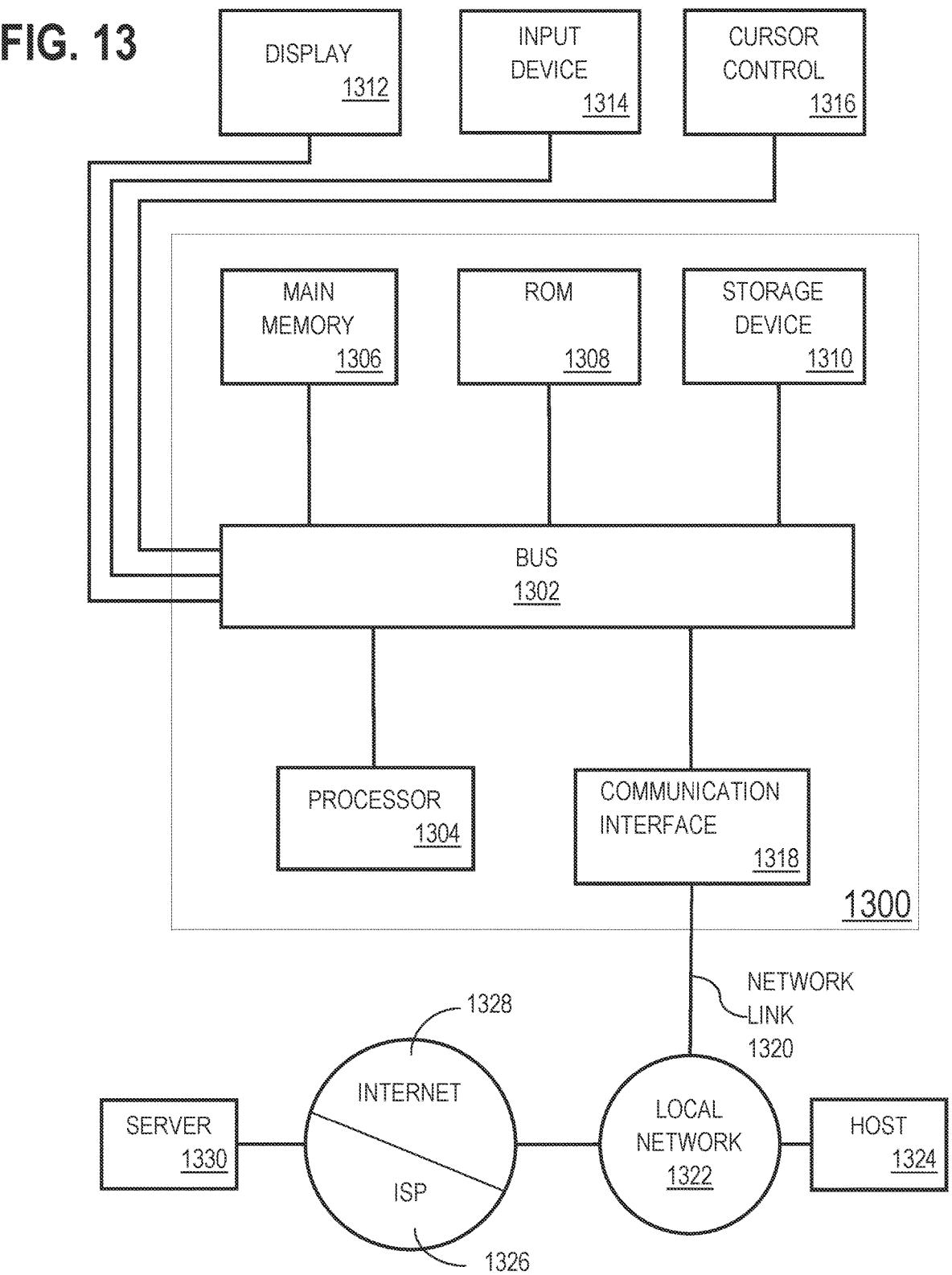
FIG. 13 shows a block diagram that illustrates a computer system in accordance with one or more embodiments.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

12. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    detecting a trigger for updating assignments of a set of hosts in a cloud environment to a set of consumers;
    responsive to detecting the trigger, identifying a set of cotenant groups for the set of consumers, wherein each respective cotenant group in the set of cotenant groups represents a respective subset of consumers to assign to a same host;
    identifying, for each respective cotenant group, a respective host, of a plurality of hosts, to assign based at least in on part on active sessions of the set of consumers on the set of hosts; and
    updating the assignments of the set of hosts based at least in part on which respective host is assigned to each respective cotenant group.

2. The one or more media of claim 1, wherein identifying the respective host to assign based at least in part on the active sessions of the set of consumers on the set of hosts comprises: selecting a particular host of the plurality of hosts that minimizes interruptions of the active sessions.

3. The one or more media of claim 1, wherein identifying the respective host to assigned assign based at least in part on the active sessions of the set of consumers on the set of hosts comprises: determining a penalty incurred for each host in the set of hosts for different sets of proposed assignments, wherein the penalty incurred for each host is determined based at least in part on each active session on the host that is interrupted when adopting a set of proposed assignments.

4. The one or more media of claim 3, wherein the instructions further cause:
    determining a total penalty for each set of proposed assignments of the different sets of proposed assignments based at least in part on a sum of the penalty incurred for each host in the set of hosts; wherein the assignments are updated based at least in part on which set of proposed assignments minimizes the total penalty.

5. The one or more media of claim 1, wherein each respective cotenant group of the set of the set of cotenant groups is assigned to a different respective host of the set of hosts.

6. The one or more media of claim 1, wherein the instructions further cause:
    applying the updated assignments, wherein applying the updated assignments interrupts at least one active session.

7. The one or more media of claim 1, wherein the set of cotenant groups are identified based at least in part on historical resource usages of the set of consumers.

8. The one or more media of claim 7, wherein the instructions further cause:
    determining, based at least in part on the historical resource usages of the set of consumers, possible combinations of resource usages of consumers per host.

9. The one or more media of claim 7, wherein the set of cotenant groups are further identified based at least in part on a resource capacity for each respective host in the set of hosts.

10. The one or more media of claim 1, wherein the set of cotenant groups are identified based at least in part on resource guarantees associated with the set of consumers.

11. The one or more media of claim 10, wherein a constraint requires that a sum of resource guarantees for the respective cotenant group assigned to the same host be less than or equal to a resource capacity of the same host.

12. The one or more media of claim 1, wherein the set of cotenant groups are identified based at least in part on a resource usage constraint that requires a sum of hypothetical resource usages of the consumers in the respective cotenant group assigned to the same host to be less than or equal to a resource capacity of the same host.

13. The one or more media of claim 1, wherein the set of cotenant groups are identified based at least in part on a constraint that requires a maximum resource usage of the consumers in the respective cotenant group assigned to the same host to be equal to a maximum host usage.

14. The one or more media of claim 1, wherein the set of cotenant groups are identified based at least in part on a constraint that enforces a fixed sequence for a traversal of the set of hosts when identifying hosts to assign.

15. The one or more media of claim 1, wherein the set of cotenant groups includes only consumers that are not divided across multiple hosts.

16. The one or more media of claim 15, wherein the instructions further cause assigning a consumer that is divided across multiple hosts based at least in part on the updated assignments of the set of hosts.

17. The one or more media of claim 1, wherein the set of cotenant groups includes database instances that share the same host.

18. A system comprising:
one or more hardware processors;
one or more non-transitory machine-readable media storing instructions which, when executed by the one or more hardware processors, cause:
detecting a trigger for updating assignments of a set of hosts in a cloud environment to a set of consumers;
responsive to detecting the trigger, identifying a set of cotenant groups for the set of consumers, wherein each respective cotenant group in the set of cotenant groups represents a respective subset of consumers to assign to a same host;
identifying, for each respective cotenant group, a respective host, of a plurality of hosts, to assign based at least in on part on active sessions of the set of consumers on the set of hosts; and
updating the assignments of the set of hosts based at least in part on which respective host is assigned to each respective cotenant group.

19. A method, comprising:
detecting a trigger for updating assignments of a set of hosts in a cloud environment to a set of consumers;
responsive to detecting the trigger, identifying a set of cotenant groups for the set of consumers, wherein each respective cotenant group in the set of cotenant groups represents a respective subset of consumers to assign to a same host;
identifying, for each respective cotenant group, a respective host, of a plurality of hosts, to assign based at least in on part on active sessions of the set of consumers on the set of hosts; and
updating the assignments of the set of hosts based at least in part on which respective host is assigned to each respective cotenant group.

20. The method of claim 19, wherein identifying the respective host to assign based at least in part on the active sessions of the set of consumers on the set of hosts comprises: selecting a particular host of the plurality of hosts that minimizes interruptions of the active sessions.

* * * * *

UNITED STATES PATENT AND TRADEMARK OFFICE
CERTIFICATE OF CORRECTION

PATENT NO. : 12,047,305 B2
APPLICATION NO. : 17/979688
DATED : July 23, 2024
INVENTOR(S) : Griffin et al.

It is certified that error appears in the above-identified patent and that said Letters Patent is hereby corrected as shown below:

In the Specification

In Column 2, Line 55, delete "PRORAMMING" and insert -- PROGRAMMING --, therefor.

In Column 2, Line 58, delete "PRORAMMING" and insert -- PROGRAMMING --, therefor.

In Column 2, Line 61, delete "PRORAMMING" and insert -- PROGRAMMING --, therefor.

In Column 8, Line 35, delete "DBA" and insert -- DB A --, therefor.

In Column 14, Line 43, delete "6]" and insert -- 6]. --, therefor.

In Column 17, Lines 38-39, delete "consumer," and insert -- $consumer_i$ --, therefor.

In Column 17, Line 43, delete "consumer." and insert -- $consumer_i$ --, therefor.

In Column 20, Line 46, delete "consumer," and insert -- $consumer_i$ --, therefor.

In Column 20, Line 47, delete "Guarantee," and insert -- $Guarantee_i$ --, therefor.

In Column 21, Line 28, delete "consumer," and insert -- $consumer_i$ --, therefor.

In Column 21, Line 33, delete "consumer," and insert -- $consumer_i$ --, therefor.

In Column 22, Line 36, delete "consumer," and insert -- $consumer_i$ --, therefor.

In Column 23, Line 66, delete "μm." and insert -- pm. --, therefor.

In Column 25, Lines 50-51, delete "structures" and insert -- structures. --, therefor.

Signed and Sealed this
Tenth Day of December, 2024

Katherine Kelly Vidal
*Director of the United States Patent and Trademark Office*

CERTIFICATE OF CORRECTION (continued)
U.S. Pat. No. 12,047,305 B2

In Column 25, Line 54, delete "embodiments;" and insert -- embodiments. --, therefor.

In Column 36, Line 58, delete "10," and insert -- {0, --, therefor.

In Column 36, Line 58, delete "81." and insert -- 8}. --, therefor.

In the Claims

In Column 42, Line 30, in Claim 3, after "to" delete "assigned".